(12) United States Patent
Hwang et al.

(10) Patent No.: US 7,330,409 B2
(45) Date of Patent: Feb. 12, 2008

(54) DISC WITH TEMPORARY DEFECT MANAGEMENT AREA, AND DISC DEFECT MANAGEMENT METHOD AND APPARATUS THEREFOR

(75) Inventors: Sung-hee Hwang, Seoul (KR); Jung-wan Ko, Suwon-si (KR); Kyung-geun Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 579 days.

(21) Appl. No.: 10/751,729

(22) Filed: Jan. 6, 2004

(65) Prior Publication Data

US 2004/0190406 A1 Sep. 30, 2004

(30) Foreign Application Priority Data

| Jan. 13, 2003 | (KR) | ...................... 10-2003-0002091 |
| Jan. 13, 2003 | (KR) | ...................... 10-2003-0002092 |
| Feb. 28, 2003 | (KR) | ...................... 10-2003-0012867 |

(51) Int. Cl.
*G11B 7/00* (2006.01)

(52) U.S. Cl. .............................. 369/53.17; 369/47.14; 369/30.21; 369/30.24; 369/275.3; 714/48

(58) Field of Classification Search ............. 369/47.14, 369/53.17, 53.15, 47.17, 30.21, 30.24, 30.36; 714/275.348
See application file for complete search history.

(56) References Cited

U.S. PATENT DOCUMENTS

| 4,833,665 A | * | 5/1989 | Tokumitsu et al. ...... 369/53.17 |
| 5,303,219 A | * | 4/1994 | Kulakowski et al. .... 369/53.17 |
| 5,319,626 A | * | 6/1994 | Ozaki et al. ............. 369/53.17 |
| 5,404,357 A | * | 4/1995 | Ito et al. ..................... 714/719 |
| 5,526,335 A | * | 6/1996 | Tamegai ................... 369/53.16 |
| 5,705,221 A | * | 1/1998 | Yoerger ...................... 427/214 |
| 5,841,748 A | * | 11/1998 | Yamamuro ............... 369/47.14 |
| 5,914,928 A | * | 6/1999 | Takahashi ................ 369/47.14 |
| 5,991,253 A | * | 11/1999 | Yamamuro ............... 369/47.14 |
| 6,160,778 A | * | 12/2000 | Ito et al. ................... 369/53.15 |

(Continued)

FOREIGN PATENT DOCUMENTS

CN 1323032 11/2001

(Continued)

OTHER PUBLICATIONS

Office Action issued in Taiwanese Patent Application No. 93100638 on Mar. 10, 2006.

(Continued)

*Primary Examiner*—Wayne Young
*Assistant Examiner*—Thomas Alunkal
(74) *Attorney, Agent, or Firm*—Stein, McEwen & Bui, LLP

(57) ABSTRACT

A write once disc with at least one record layer includes a temporary defect management area in which temporary defect information regarding only defect detected during a corresponding recording operation, and temporary defect management information for managing the temporary defect information are recorded; and defect management areas in which the temporary defect information and temporary defect management information recorded in the temporary defect management area are recorded as defect information and defect management information, respectively.

52 Claims, 16 Drawing Sheets

U.S. PATENT DOCUMENTS

| | | | |
|---|---|---|---|
| 6,249,884 B1 * | 6/2001 | Joo | 714/42 |
| 6,282,365 B1 * | 8/2001 | Gotoh et al. | 386/95 |
| 6,292,625 B1 * | 9/2001 | Gotoh et al. | 386/95 |
| 6,469,978 B1 * | 10/2002 | Ohata et al. | 369/275.3 |
| 6,564,345 B1 * | 5/2003 | Kim et al. | 714/723 |
| 6,754,860 B2 * | 6/2004 | Kim et al. | 714/723 |
| 6,922,802 B2 * | 7/2005 | Kim et al. | 714/723 |
| 6,963,523 B1 * | 11/2005 | Park | 369/47.14 |
| 7,188,271 B2 * | 3/2007 | Park et al. | 714/6 |
| 2002/0009028 A1 * | 1/2002 | Ijtsma et al. | 369/47.14 |
| 2002/0136537 A1 * | 9/2002 | Takahashi | 386/95 |

FOREIGN PATENT DOCUMENTS

| | | |
|---|---|---|
| JP | 07-057397 | 3/1995 |
| JP | 9-320204 | 12/1997 |
| JP | 09-320204 | 12/1997 |
| JP | 2001-351337 | 12/2001 |
| JP | 2002-329321 | 11/2002 |

OTHER PUBLICATIONS

Office Action issued on Feb. 9, 2007 by the Chinese Patent Office for Chinese Patent Application No. 20040002117.8.

U.S. Appl. No. 10/670,363, filed Sep. 26, 2003, Sung-hee Hwang, Samsung Electronics Co., Ltd.

U.S. Appl. No. 10/638,555, filed Aug. 12, 2003, Jung-wan Ko et al., Samsung Electronics Co., Ltd.

* cited by examiner

DISC WITH TEMPORARY DEFECT MANAGEMENT AREA, AND DISC DEFECT MANAGEMENT METHOD AND APPARATUS THEREFOR

CROSS-REFERENCE TO RELATED APPLICATIONS

This application claims the benefit of Korean Patent Application No. 2003-2091 filed on Jan. 13, 2003 in the Korean Intellectual Property Office, Korean Patent Application No. 2003-2092 filed on Jan. 13, 2003 in the Korean Intellectual Property Office, and Korean Patent Application No. 2003-12867 filed on Feb. 28, 2003 in the Korean Intellectual Property Office, the disclosures of which are incorporated herein in their entirety by reference.

BACKGROUND OF THE INVENTION

1. Field of the Invention

The present invention relates to disc defect management, and more particularly, to a disc with a temporary defect management area (TDMA) and a disc defect management method and apparatus therefor.

2. Description of the Related Art

Disc defect management is the process of rewriting data stored in a user data area of a disc in which a defect exists to a new portion of the disc's data area, thereby compensating for data loss otherwise caused by the defect. In general, disc defect management is performed using a linear replacement method or a slipping replacement method. In the linear replacement method, the user data area in which a defect exists is replaced with a spare data area having no defects. In the slipping replacement method, the user data area with the defect is slipped and the next user data area having no defects is used. Both the linear replacement and slipping replacement methods are, however, applicable only to discs such as a DVD-RAM/RW, on which data can be repeatedly recorded and recording can be performed using a random access method. In other words, the linear replacement and slipping replacement methods are difficult to be applied to write once discs on which recording is allowed only once.

In general, the presence of defects in a disc is detected by recording data on the disc and confirming whether the data has been recorded correctly on the disc. However, once data is recorded on a write once disc, it is impossible to overwrite new data and manage defects therein.

After the development of a CD-R and a DVD-R, a high-density write once disc with a recording capacity of several dozen GBs was introduced. This type of disc can be used as a backup disc since it is not expensive and allows random access that enables fast reading operations. However, disc defect management is not available for write once discs. Therefore, a backup operation may be discontinued when a defective area (i.e., an area where a defect exists) is detected during the backup operation. In general, a backup operation is performed when a system is not frequently used (e.g., at night when a system manager does not operate the system. In this situation, it is more likely that the backup operation will be discontinued because a defective area of a write once disc is detected.

SUMMARY OF THE INVENTION

An aspect of the present invention provides a write once disc, and a disc defect management method and apparatus applicable to the write once disc.

An aspect of the present invention also provides a disc in which disc defect management can be performed even when a disc defect is detected during a recording operation, thus allowing the recording operation to be performed without interruption, and a disc defect management method and apparatus therefor.

An aspect of the present invention also provides a disc in which defect information can be effectively recorded, and a disc defect management method and apparatus therefor.

Additional aspects and/or advantages of the invention will be set forth in part in the description which follows and, in part, will be obvious from the description, or may be learned by practice of the invention.

According to an aspect of the present invention, a write once disc with at least one record layer includes a temporary defect management area in which temporary defect information regarding only a defect detected during a corresponding recording operation, and temporary defect management information for managing the temporary defect information are recorded; and defect management areas in which the temporary defect information and the temporary defect management information recorded in the temporary defect management area are recorded as defect information and defect management information, respectively.

According to another aspect of the present invention, a write once disc includes a temporary defect management area in which temporary defect information regarding only a defect detected during a corresponding recording operation, and temporary defect management information for managing the temporary defect information are recorded; a temporary finalized defect management area in which temporary finalized defect information that includes at least a portion of the temporary defect information recorded in the temporary defect management area, and temporary finalized defect management information for managing the temporary finalized defect information are recorded; and defect management areas in which all of the recorded temporary defect information and temporary defect management information are recorded as defect information and defect management information, respectively, during disc finalization where, the temporary defect information and the temporary defect management information are recorded as a pair of information in the temporary defect management area.

According to yet another aspect of the present invention, a method of managing disc defects, includes recording only information regarding a defect detected in data, which is recorded in a data area of a disc during a recording operation having an index of i, where i is an integer, as ith temporary defect information in a temporary defect management area; recording management information for managing the ith temporary defect information as ith temporary defect management information in the temporary defect management area; repeating the recording the ith temporary defect information and the recording the ith temporary defect management information at least once while increasing the index i given to a corresponding recording operation, the temporary defect information, and the temporary defect management information by 1; and reading and writing all of the recorded temporary defect management information and temporary defect information in a defect management area.

According to still another aspect of the present invention, a method of managing disc defects, includes recording temporary management information that includes temporary defect information and temporary defect management information regarding data, which is recorded in a data area of a disc according to a recording operation having an index of i, where i is an integer, as ith temporary defect management information in a temporary defect management area in units of a predetermined number of blocks; repeating the recording the temporary management information at least once while increasing the index i given to a corresponding recording operation and the temporary management information by 1; recording temporary finalized defect management information, which is obtained based on all recorded temporary management information, in a temporary finalized defect management area whenever the ith temporary management information is recorded k times, wherein k is an integer more than or equal to 2; repeating the recording the ith temporary management information, the repeating the recording, and the recording the temporary finalized defect management information at least once; and reading all of recorded temporary defect management information and temporary defect information and recording the temporary defect management information and temporary defect information in a defect management area.

According to still another aspect of the present invention, a recording and reproducing apparatus includes a recording/ reading unit that records data on and/or reads data from a disc; and a controller that controls the recording/reading unit to record information regarding a defect detected from the recorded data, which is recorded in a data area of the disc in recording operation units, as temporary defect information in a temporary defect management area, and record management information for managing the temporary defect information in the temporary defect management area.

According to still another aspect of the present invention, a recording and/or reproducing apparatus includes a recording/reading unit that records data on and/or reads data from a disc; and a controller that controls the recording/reading unit to record information regarding a defect detected from the recorded data, which is recorded in a data area of the disc according to a first recording operation, as first temporary defect information in a temporary defect management area; records defect management information for managing the first temporary defect information as first temporary defect management information in the temporary defect management area; records data in the data area while increasing the index i given to a corresponding recording operation, the temporary defect information, and the temporary defect management information by 1; and reads all of the recorded temporary defect information and temporary defect management information in a defect management area during disc finalization.

According to still another aspect of the present invention, a recording and/or reproducing apparatus includes a recording/reading unit that records data on and/or reads data from a disc; and a controller that controls the recording/reading unit to record temporary defect management information in a temporary defect management area in units of a predetermined number of blocks; and record temporary finalized defect management information obtained based on all of temporary defect management information, which is recorded in the temporary defect management information, in a temporary finalized defect management area whenever the temporary defect management information is recorded k times, the management information including temporary defect information regarding data recorded in a data area of the disc according to a recording operation, and temporary defect management information.

BRIEF DESCRIPTION OF THE DRAWINGS

These and other aspects and/or advantages of the present invention will become more apparent and more readily appreciated by describing in detail embodiments thereof with reference to the accompanying drawings in which.

DETAILED DESCRIPTION OF THE EMBODIMENTS

Figure 1:
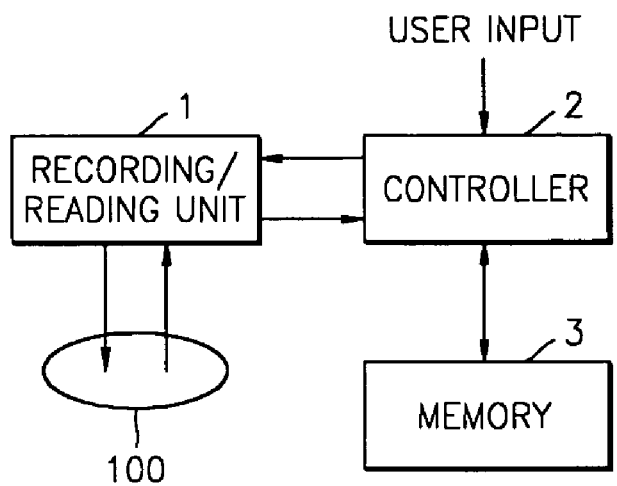
FIG. 1 is a block diagram of a recording apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a recording apparatus according to an embodiment of the present invention. The recording and/or reproducing apparatus includes a recording/reading unit 1, a controller 2, and a memory 3. The recording/reading unit 1 records data on a disc 100, which is an information storage medium according to an embodiment of the present invention. The recording/reading unit 1 further reads back the data from the disc 100 to verify the accuracy of the recorded data. The controller 2 performs disc defect management according to an aspect of the present invention. In this embodiment, the controller 2 uses a verify-after-write method, in which data is recorded on the disc 100 in predetermined units of data and the accuracy of the recorded data is verified to detect if an area of the disc 100 has a defect. In other words, the controller 2 records user data on the disc 100 in units of recording operations, and verifies the recorded user data to detect an area of the disc 100 in which a defect exists. Thereafter, the controller 2 creates information indicating a position of the area with the defect and stores the created information in the memory 3. When the amount of the stored information reaches a predetermined level, the controller 2 records the stored information as temporary defect information on the disc 100. While described in terms of a recording apparatus, it is understood that the apparatus of FIG. 1 further reproduces data according to a further aspect of the invention.

According to an aspect of the invention, the recording operation is an operation unit determined according to a user's intention or a recording work to be performed. According to this embodiment, a recording operation indicates a process in which the disc 100 is loaded into the recording apparatus, data is recorded on the disc 100, and the disc 100 is taken out from the recording apparatus. During the recording operation, data is recorded and verified at least once. In general, the data is recorded and verified several times. Defect information obtained using the verify-after-write method is temporarily stored as temporary defect information in the memory 3.

When a user presses the eject button (not shown) of the recording and/or reproducing apparatus in order to remove the disc 100 after recording the data or the recording operation is otherwise designated as being completed, the controller 2 expects the recording operation to be terminated. The controller 2 reads the defect information from the memory 3, provides the defect information to the recording/reading unit 1, and controls the recording/reading unit 1 to record the defect information on the disc 100. In the shown example, the defect information is recorded as the temporary defect information on the disc 100 in recording operation units. The recording defect information in the recording operation units is understood as recording information regarding a defect detected during only a corresponding recording operation unit. However, it is understood that other definitions for recording operations can be used.

When the recording of data is completed (i.e., additional data will not be recorded on the disc 100), the disc 100 needs to be finalized. The controller 2 controls the recording/reading unit 1 to rewrite the recorded temporary defect information and the recorded temporary defect management information, which are stored in the disc 100, as defect management information to a defect management area (DMA) of the disc 100.

Figure 2A:
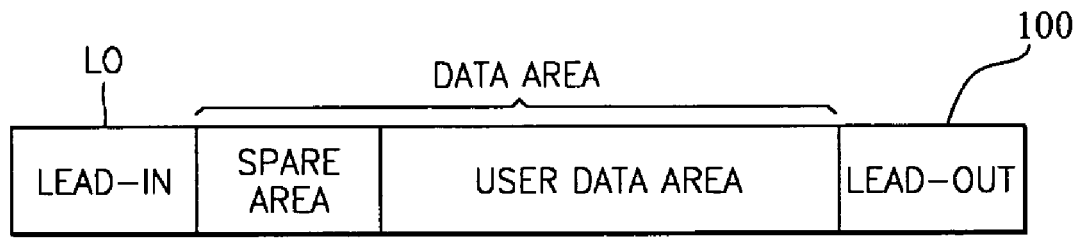
FIGS. 2A and 2B illustrate structures of a disc according to embodiments of the present invention.
Figure 2B:
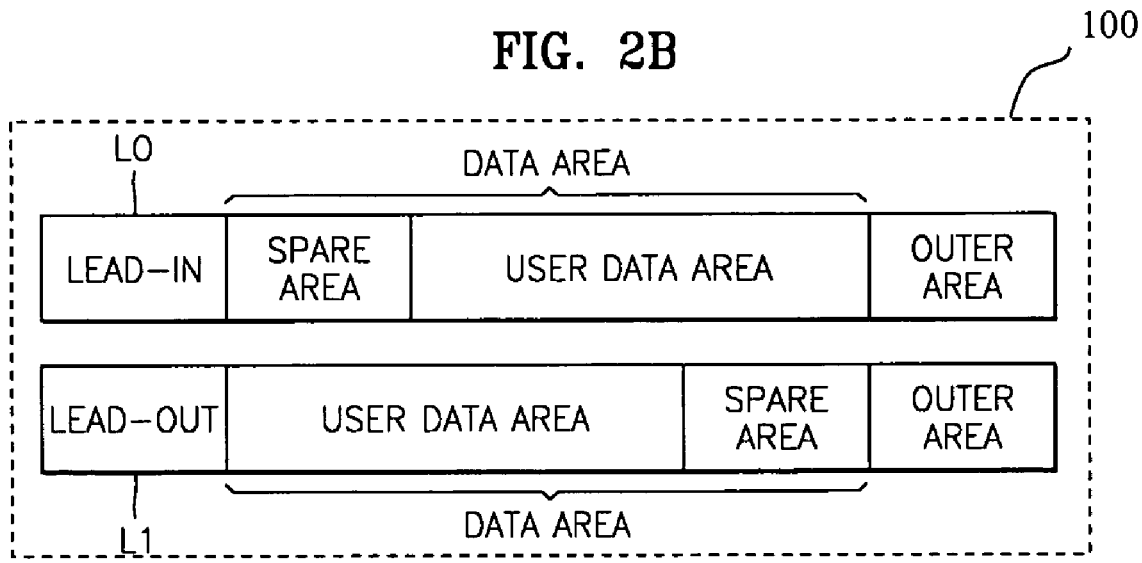

FIGS. 2A and 2B illustrate structures of the disc 100 of FIG. 1 according to embodiments of the present invention. FIG. 2A illustrates in detail a single record layer disc 100 having a record layer L0. The disc 100 includes a lead-in area, a data area, and a lead-out area. The lead-in area is located in an inner part of the disc 100 and the lead-out area is located in an outer part of the disc 100. The data area is present between the lead-in area and the lead-out area and is divided into a user data area and a spare area.

The user data area is an area where the user data is recorded. The spare area is a replacement area for a user data area having a defect and serves to compensate for the loss in the recording area due to the defect. On the assumption that defects may occur within the disc 100, it is preferable that the spare area assumes about 5% of the entire data capacity of the disc 100, so that a greater amount of data can be recorded on the disc 100. However, it is understood that other amounts can be used as the spare area.

FIG. 2B illustrates a double record layer disc 100 having two record layers L0 and L1. A lead-in area, a data area, and an outer area are sequentially formed from the inner part of the first record layer L0 to its outer part. Also, an outer area, a data area, and a lead-out area are sequentially formed from the outer part of the second record layer L1 to the inner part. Unlike the single record layer disc 100 of FIG. 2A, the lead-out area is present in the inner part of the disc 100 of FIG. 2B. That is, the disc 100 of FIG. 2B has an opposite track path (OTP) in which data is recorded starting from the lead-in area of the first record layer L0 toward its outer area and continuing from the outer area of the second record layer L1 to its lead-out area. The spare area is allotted to each of the record layers L0 and L1.

In this embodiment, the spare areas are present between the lead-in area and the user data area and between the user data area and the outer area. However, if necessary, a portion of the user data area may be used as another spare area. That is, more than one spare area may be present between the lead-in area and the lead-out area. However, the positions of the spare areas are not limited to this arrangement.

For disc defect management, a disc 100 according to an aspect of the present invention includes a temporary defect management area (TDMA), or includes both the TDMA and a temporary finalized DMA (TFDMA). Hereinafter, disc defect management using a TDMA, according to an embodiment of the present invention shown in FIG. 3A, and disc defect management using both the TDMA and a TFDMA, according to another embodiment of the present invention shown in FIG. 12A will be described.

Figure 3A:
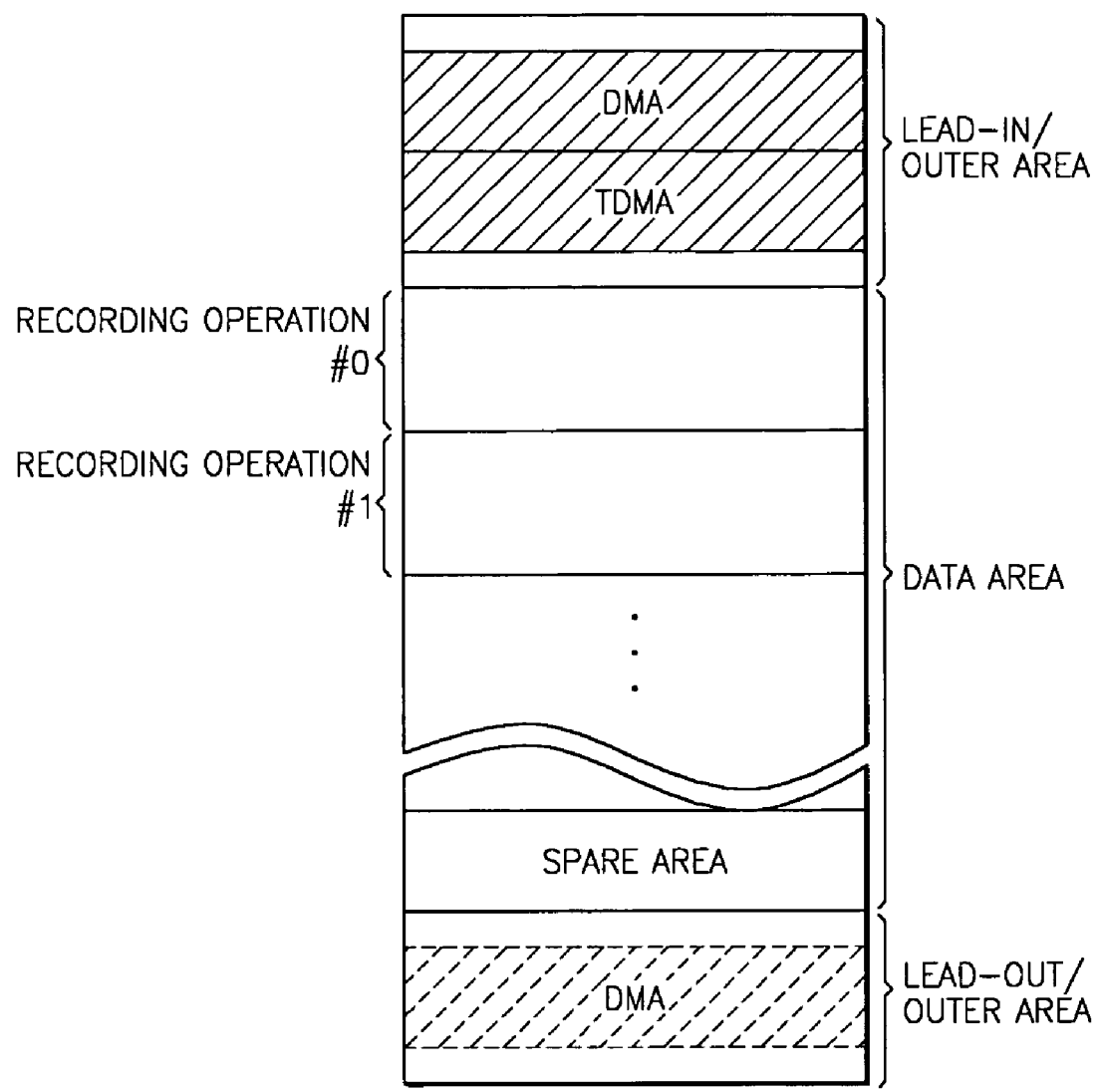
FIG. 3A illustrates a data structure of a disc according to an embodiment of the present invention.

FIG. 3A illustrates a data structure of the disc 100 of FIGS. 2 and 2B according to an embodiment of the present invention. Referring to FIG. 3A, if the disc 100 is a single record layer disc of FIG. 2A, a defect management area (DMA) and a temporary DMA (TDMA) are formed in a lead-in area. Alternatively, the DMA may be included in both the lead-in area and a lead-out area, or the TDMA may also be included in the lead-out area. That is, the DMA and the TDMA may be present in at least one of the lead-in area and the lead-out area. If the disc 100 is a double record layer disc shown in FIG. 2B, the DMA and the TDMA are respectively present in a lead-in area and a lead-out area located at an inner part of the disc 100. The DMA may further be included in the lead-out area and an outer area that are located at an outer part of the disc 100. Accordingly, the DMA and the TDMA are present in at least one of the lead-in area, the lead-out area, and the outer area according to an aspect of the invention.

In general, information relating to managing disc defects in the disc 100 is recorded in the DMA. Such information specifies or includes the structure of the disc 100 for disc defect management, whether the disc defect management is performed, defect information, the location of the defect information, and the position and size of a spare area. In this embodiment, because the disc 100 is a write once disc, new data is recorded after previously recorded data when the above information changes.

In general, when a disc 100 is loaded into a recording and/or reading apparatus such as that shown in FIG. 1, the apparatus reads data from a lead-in area and a lead-out area of the disc 100 to determine how to manage the disc 100 and record data on or read data from the disc 100. However, if the amount of data recorded in the lead-in area and/or the lead-out area increases, a longer time is spent on preparing the recording or reproducing of data after the loading of the disc 100. To solve this problem, an aspect of the present invention uses temporary defect management information and temporary defect information that are to be recorded in a TDMA. The TDMA is allotted to the lead-in area and/or the lead-out area of a disc 100, and is separated from the DMA. That is, only last-recorded defect information and defect management information, which are required to perform disc defect management, are recorded in the DMA, thereby reducing the amount of information that the recording/reading unit 1 requires for a recording/reproducing operation.

In the shown embodiment, since the disc defect management is performed using the linear replacement method, the temporary defect information includes information indicating the position of an area of the disc 100 having a defect and information indicating the position of an area of the disc 100 that is replacement for the area having the defect. While not required, preferably, the temporary defect information further includes information indicating whether the defect occurs in a single defect block or physically continuous defect blocks. The temporary defect management information is used to manage the temporary defect information and includes information indicating the location of the temporary defect information recorded on the disc 100. Detailed data structures of temporary defect information and temporary defect management information will be explained later. It is understood that the temporary defect information can include other information, and that other methods of defect management could be used.

In the shown embodiment, the temporary defect information and temporary defect management information are recorded every time when a recording operation ends. In the TDMA, information regarding a defect occurring in data recorded during a recording operation #0 and information regarding its replacement are recorded as temporary defect information #0, and information regarding a defect occurring in data recorded during a recording operation #1 and information regarding its replacement are recorded as temporary defect information #1. Further, management information for managing temporary defect information #0, #1 is recorded as temporary defect management information #0, #1 in the TDMA, the management information specifying the recording locations of the temporary defect information #0, #1. When additional data cannot be recorded in the data area or a user does not wish to record additional data therein (i.e., disc finalization is required), the temporary defect information and temporary defect management information recorded in the TDMA are rewritten to the DMA.

The temporary defect information and the temporary defect management information are rewritten to the DMA for the following reasons. In the case that additional data will not be recorded on the disc 100 (i.e., the disc 100 needs to be finalized), only last recorded ones of the temporary defect management information and temporary defect information, which have been updated several times, are again recorded in the DMA. Thus, the recording/reading unit 1 can quickly read defect management information from the disc 100 just by reading the last recorded defect management information, thereby enabling fast initializing of the disc 100. Further, recording of the temporary defect information and temporary defect management information in the DMA increases the reliability of information.

In this embodiment, defect information contained in previously recorded temporary defect information #0, #1, #2, and #i−1 is not included in the temporary defect information #i. That is, only information regarding a defect detected from a recording area during a corresponding recording operation #i is included in the temporary defect information #i. For instance, the temporary defect information #0 specifies a defect detected during a recording operation #0, and the temporary defect information #1 specifies only a defect detected during a recording operation #1. Accordingly, it is possible to effectively use a recording area of the TDMA. In other words, the recording area of the lead-in area (or the lead-out area or the outer area) including the TDMA is smaller than a data area where user data is recorded. Nevertheless, if information regarding a defect detected whenever a recording operation is performed is recorded to include all of information regarding defects detected during previous recording operations, data may not be further recorded in the TDMA before the data area is full of data. For this reason, in this embodiment, temporary defect information includes only information regarding a defect detected during a related recording operation. Instead, during disc finalization, all defect information included in the temporary defect information #0, #1, #2, #i is read and written to the DMA.

In the case of a high-density disc with a recording capacity of several dozens of GBs, it is desirable that a cluster is allocated to an area in which temporary defect management information #i is recorded and four to eight clusters are allocated to an area in which temporary defect information #i is recorded. This is because it is preferable to record new information in units of clusters to update information when a minimum physical unit of record is a cluster, although the amount of temporary defect information #i is just several KBs. A total amount of defects allowed in a disc is preferably about 5 percent of the disc recording capacity. For instance, about four to eight clusters are required to record temporary defect information #i, considering that information regarding a defect is about 8 bytes long and the size of a cluster is 64 KBs long.

The verify-after-write method can also be performed on temporary defect information #i and temporary defect management information #i. When a defect is detected, information recorded in an area of a disc having a defect may be either recorded in a spare area using linear replacement, or recorded in an area adjacent to the TDMA using slipping replacement.

Figure 3B:
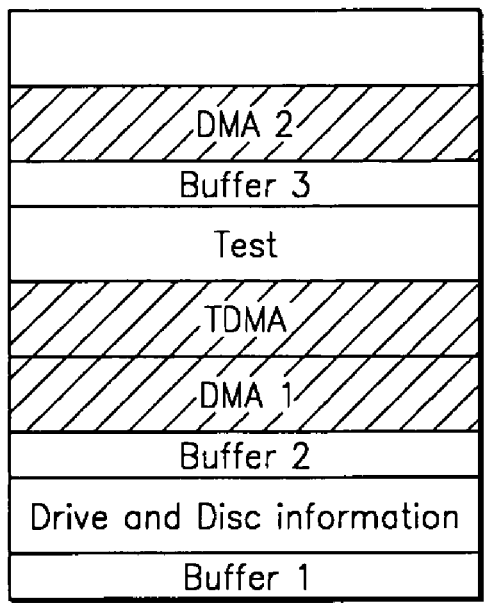
FIG. 3B illustrates a data structure of a disc with defect management areas (DMAs) and a temporary DMA (TDMA) shown in FIG. 3A.

FIG. 3B illustrates a data structure of a disc with a TDMA and a DMA shown in FIG. 3A. Referring to FIG. 3B, two DMAs (i.e., DMA #1 and DMA #2) are formed to increase the robustness of defect management information and defect information. TDMA denotes a temporary defect management area; Test denotes an area in which recording conditions of data are measured; Drive and Disc information is an area in which information regarding a drive used during a recording and/or reproducing operation(s) and disc information are recorded; and Buffer 1, Buffer 2, and Buffer 3 are buffers indicating borders of the respective areas.

Figure 4A:
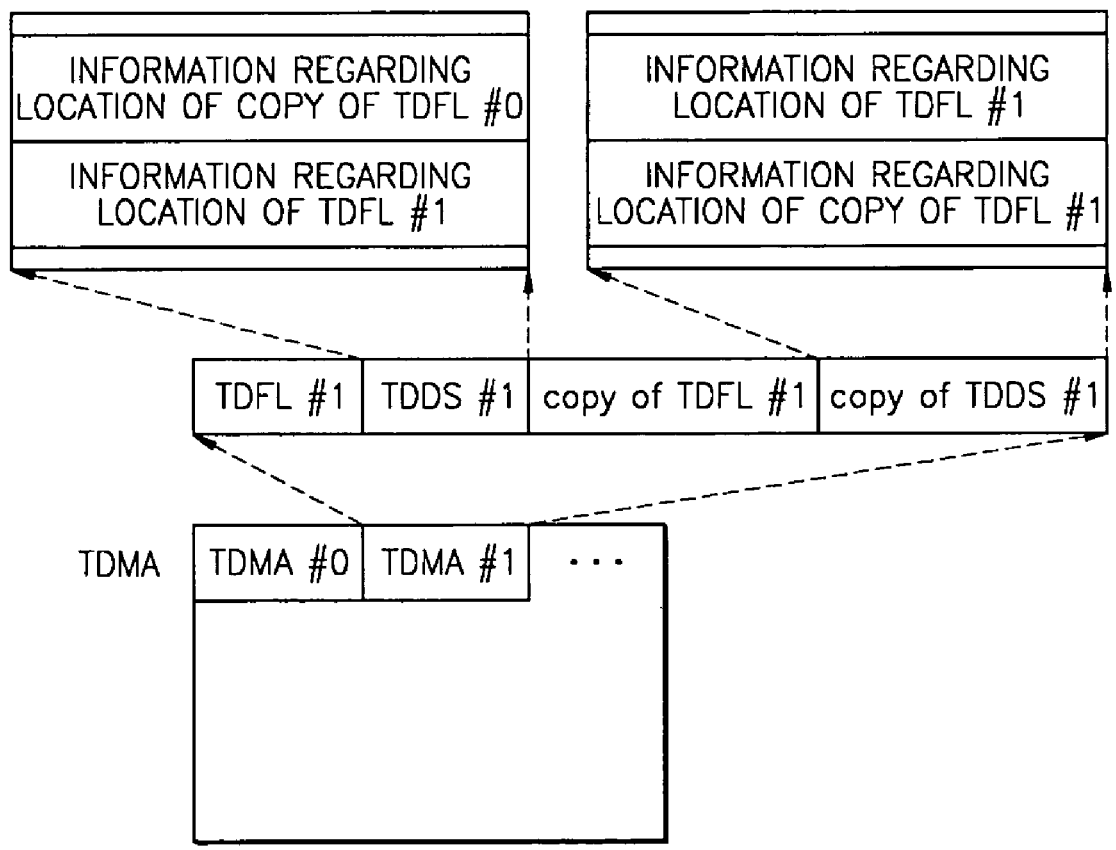
FIGS. 4A through 4C illustrate data structures of a TDMA according to embodiments of the present invention.

FIG. 4A illustrates a data structure of temporary management information TDMA according to an embodiment of the present invention. Referring to FIG. 4A, corresponding temporary defect information and temporary defect management information are recorded as a pair of information in the TDMA. More specifically, temporary management information TDMA #0, TDMA #1 are sequentially recorded starting from the start of the TDMA. A pair of corresponding temporary defect management TDDS #0 and temporary defect information TDFL #0 are included twice in the temporary management information TDMA #0. A pair of corresponding temporary defect management information TDDS #1 and temporary defect information TDFL #1 are included twice in temporary management information TDMA #1. A reason for recording the same information twice is to increase the reliability and robustness of the information. The temporary defect management information TDDS #0, #1, specifies the locations of the corresponding temporary defect information TDFL #0, #1, respectively. Each temporary defect management information further specifies the location of temporary defect information recorded right before its corresponding temporary defect information. For instance, the temporary management information TDMA #1 sequentially includes a pair of the temporary defect information TDFL #1 and temporary defect management information TDDS #1, and a copy of the temporary defect information TDFL #1 and temporary defect management information TDDS #1. The temporary defect management information TDDS #1 contains location information regarding the temporary defect information TDFL #1 and a copy of temporary defect information TDFL #0 recorded right before the temporary defect information TDFL #1. The copy of the temporary defect management information TDDS #1 contains location information regarding its corresponding copy of the temporary defect information TDFL #1, and location information regarding the temporary defect information TDFL #1. As described above, if temporary defect management information further specifies the location of temporary defect information recorded right before corresponding temporary defect information, it is possible to more rapidly read all recorded temporary defect information than where temporary defect information is accumulatively recorded. The number of recording the temporary defect management information TDDS #0, #1 and the temporary defect information TDFL #0, #1 is not limited.

Figure 4B:
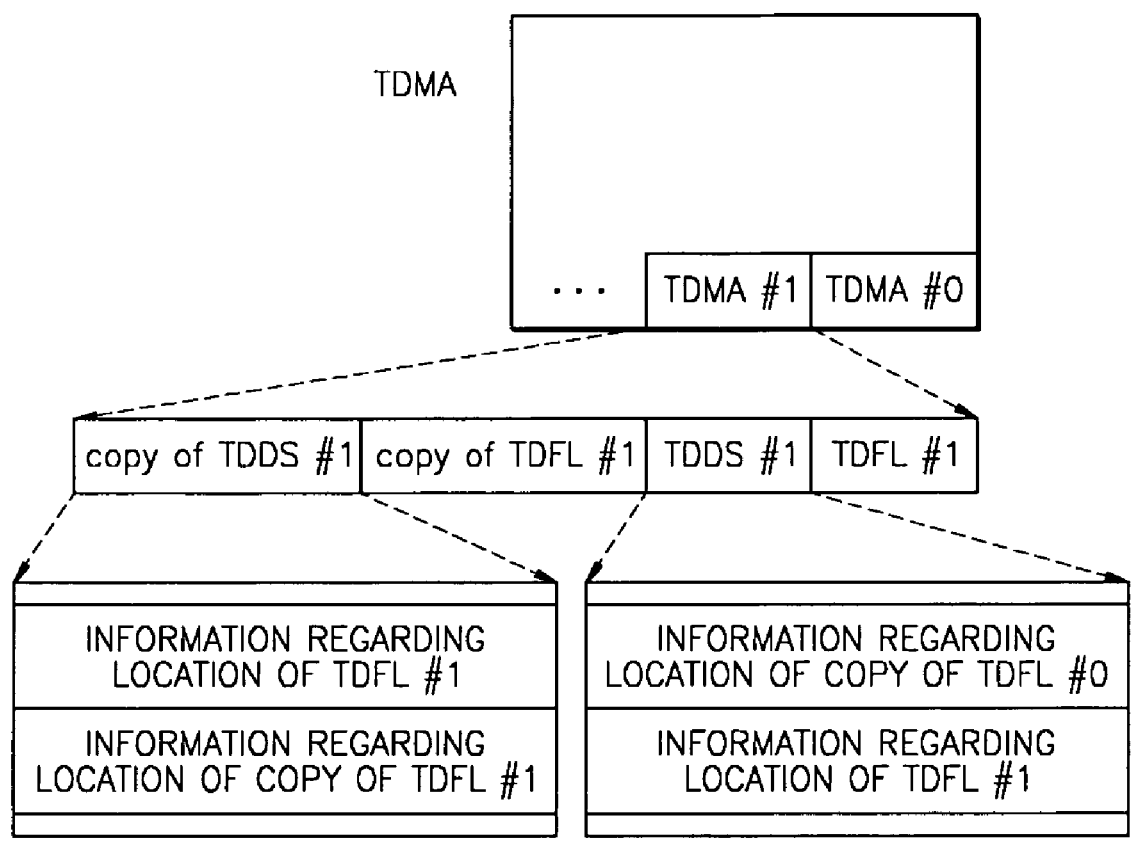

FIG. 4B illustrates a data structure of a TDMA according to another embodiment of the present invention. Compared to the TDMA of FIG. 4A, corresponding temporary defect information and temporary defect management information are recorded as a pair of information in the TDMA of FIG. 4B, but the sequence of recording the information is not the same. More specifically, temporary management information TDMA #0, #1 is sequentially recorded starting from the end of the TDMA. A pair of corresponding temporary defect management TDDS #0 and temporary defect information TDFL #0 are included twice in the temporary management information TDMA #0. A pair of corresponding temporary defect management information TDDS #1 and temporary defect information TDFL #1 are included twice in temporary management information TDMA #1, thereby increasing the reliability and robustness of the information. The temporary defect management information TDDS #0, #1 specifies the locations of their corresponding temporary defect information TDFL #0, #1 respectively. Each temporary defect management information further specifies the location of the temporary defect information recorded right before its corresponding temporary defect information. For instance, the temporary management information TDMA #1 sequentially includes a pair of the temporary defect information TDFL #1 and the temporary defect management information TDDS #1, and a copy of the temporary defect information TDFL #1 and the temporary defect management information TDDS #1. Also, the temporary defect management information TDDS #1 contains location information regarding the temporary defect information TDFL #1 and a copy of the temporary defect information TDFL #0 recorded right before the temporary defect information TDFL #1. The copy of the temporary defect management information TDDS #1 contains location information regarding its corresponding copy of the temporary defect information TDFL #1, and the location information regarding temporary defect management information TDFL #1.

Figure 4C:
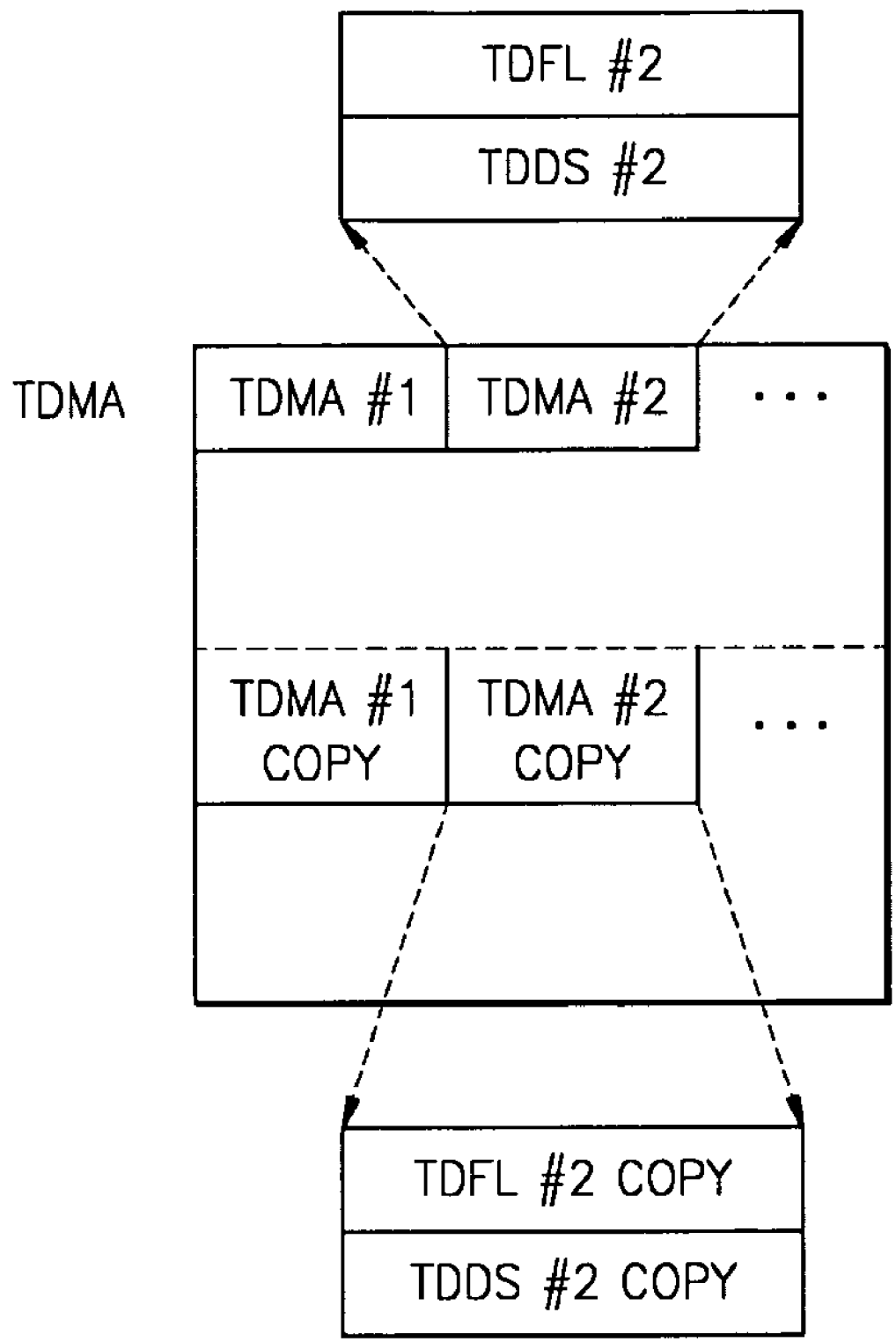

FIG. 4C illustrates a data structure of a TDMA according to yet another embodiment of the present invention. Compared to the TDMAs shown in FIGS. 4A and 4B, corresponding temporary defect information and temporary defect management information are recorded twice as a pair of information in the TDMA of FIG. 4C, and the recording positions of the pairs of information are not the same. More specifically, the TDMA of FIG. 4C is divided into two parts, and temporary management information TDMA #i and a copy thereof are recorded in the different parts. However, the TDMA can be divided into more than two parts and the temporary management information TDMA #i can be recorded more than twice.

As shown in FIGS. 4A through 4C, when temporary defect information and temporary defect management information, which constitute temporary management information TDMA #i, are recorded in a TDMA, the information are recorded as a pair of information in units of a predetermined number of blocks. For instance, temporary defect information TDFL #1 and temporary defect management information TDDS #1, which constitute temporary management information TDMA #1, are recorded together in a block. Also, a copy of the temporary defect information TDFL #1 and a copy of the temporary defect management information TDDS #1 are recorded together in a block.

Likewise, corresponding temporary defect information and temporary defect management information are recorded as a pair of information in a predetermined number of blocks, thereby making the sizes of areas where pairs of temporary defect information and temporary defect management information are recorded equal to one another.

Figure 5A:
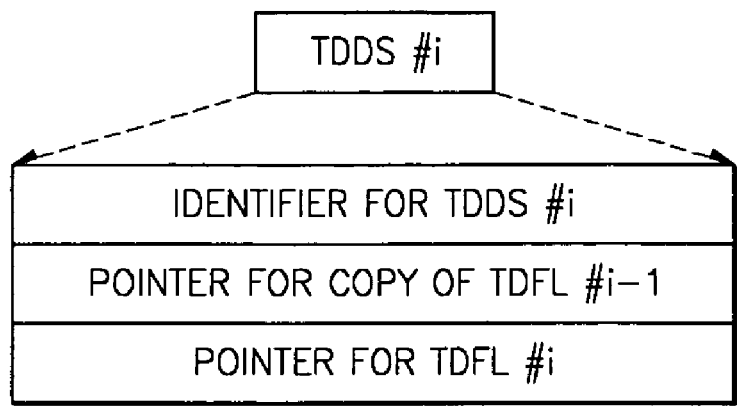
FIGS. 5A and 5B respectively illustrate data structures of temporary defect management information TDDS #i and a copy thereof, according to an embodiment of the present invention.

FIG. 5A illustrates a data structure of temporary defect management information TDDS #i. Referring to FIG. 5A, the temporary defect management information TDDS #i includes an identifier for the temporary defect management information TDDS #i, a pointer to the recording position of a copy of temporary defect information TDFL #i−1 recorded right before corresponding temporary defect information TDFL #i, and a pointer to the recording position of the temporary defect information TDFL #i.

Figure 5B:
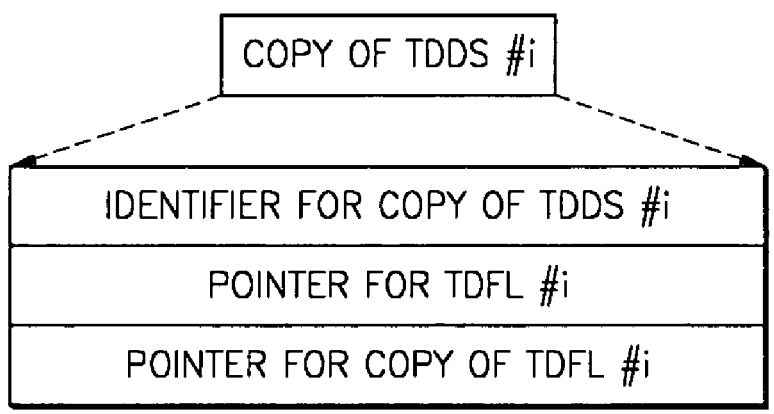

FIG. 5B illustrates a data structure of a copy of temporary defect management information TDDS #i. Referring to FIG. 5B, the copy of temporary defect management information TDDS #i contains an identifier for the copy of the temporary defect management information TDDS #i, a pointer to the recording position of the temporary defect information TDFL #i recorded in the temporary defect management information TDDS #i, and a pointer to the recording position of a copy of the temporary defect information TDFL #i.

Figure 6:
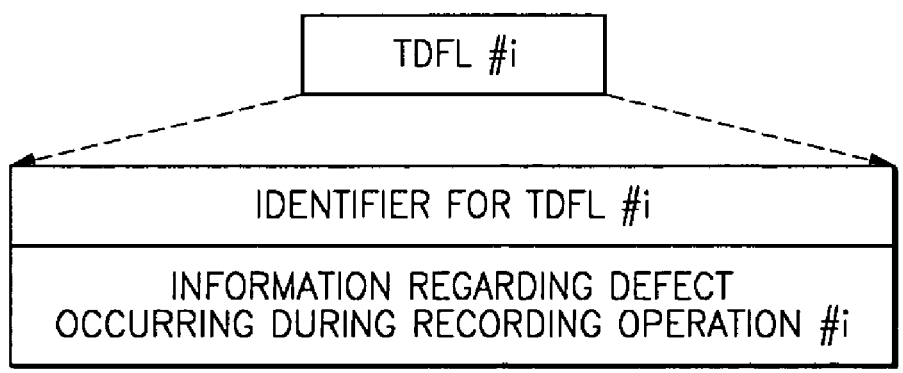
FIG. 6 illustrates a data structure of temporary defect information TDFL #i according to another embodiment of the present invention.

FIG. 6 illustrates a data structure of temporary defect information TDFL #i. Referring to FIG. 6, temporary defect information TDFL #i contains an identifier for the temporary defect information TDFL #i, and information regarding a defect detected during a corresponding recording operation #i. That is, information regarding defects detected during previous recording operations #0, #1, #i−1 is not included in the temporary defect information TDFL #i. Here, the information regarding a defect indicates the positions of the defect and its replacement and whether the defect occurs in a single defect block or continuous defect blocks.

Figure 7:
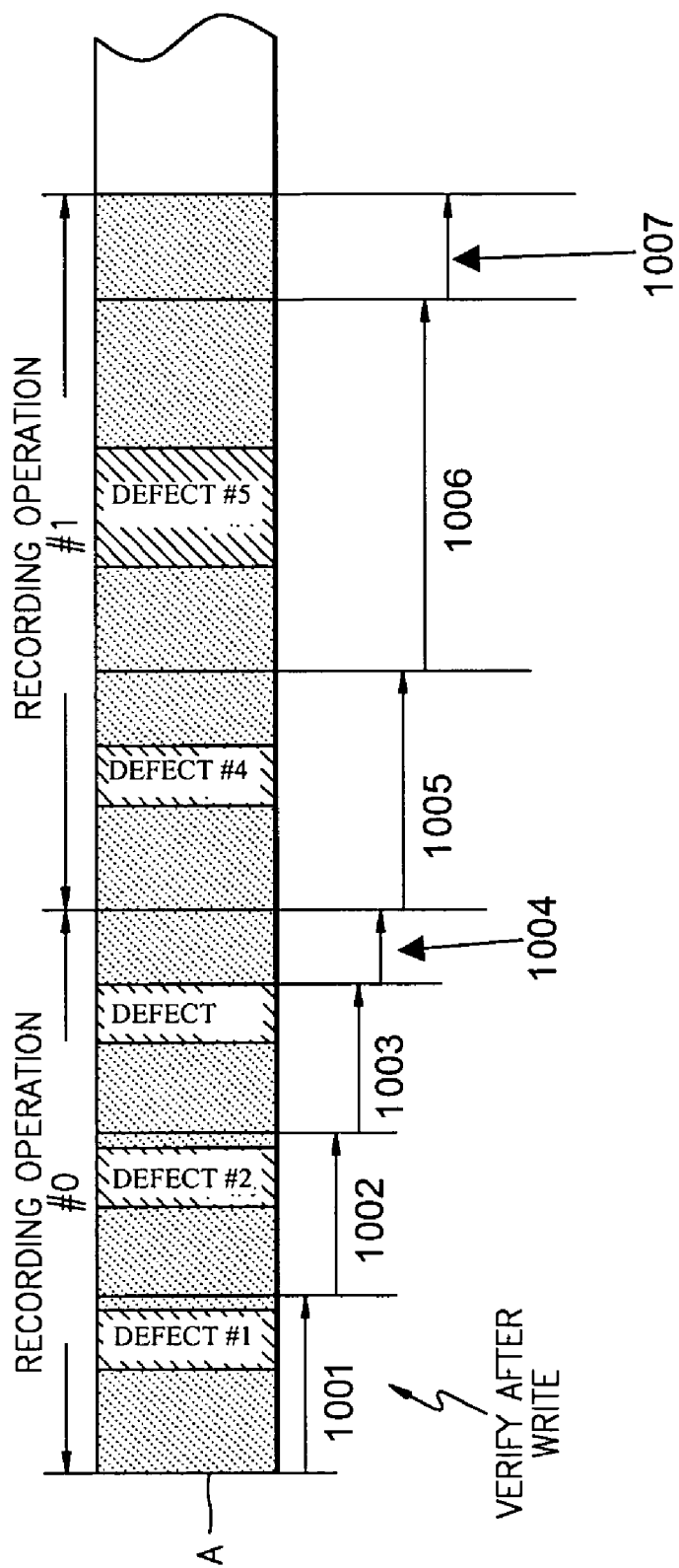
FIG. 7 illustrates diagrams explaining recording of data in a user data area A and a spare area B, according to an embodiment of the present invention.

FIG. 7 is a reference diagram illustrating in detail recording of data in a user data area A and a spare area B, according to an embodiment of the present invention. Data can be processed in units of sectors or clusters according to an aspect of the invention. A sector denotes a minimum unit of data that can be managed in a file system of a computer or in an application. A cluster denotes a minimum unit of data that can be physically recorded on a disc at once. In general, one or more sectors constitute a cluster.

There are two types of sectors: a physical sector and a logical sector. The physical sector is an area on a disc where a sector of data is to be recorded. An address for detecting the physical sector is called a physical sector number (PSN). The logical sector is a unit in which data can be managed in a file system or an application. An address for detecting the logical sector is called a logical sector number (LSN). A disc recording/reading apparatus such as that shown in FIG. 1 detects the recording position of data on a disc 100 using a PSN. In a computer or an application relating to the data, all of the data is managed in units of LSNs and the position of data is detected using an LSN. LSNs and PSNs are mapped by a controller 2 of the recording/reading apparatus, based on whether the disc 100 contains a defect and an initial recording position of data.

Referring to FIG. 7, the user data area A and the spare area B includes PSNs that are sequentially allocated to a plurality of sectors (not shown). In general, each LSN corresponds to at least one PSN. However, since LSNs are allocated to non-defective areas, including replacement areas recorded in the spare area B, the correspondence between the PSNs and the LSNs is not maintained when a disc 100 has a defective area, even if the size of a physical sector is the same as a size of a logical sector.

In the user data area A, the user data is recorded either in a continuous recording mode or a random recording mode. In the continuous recording mode, the user data is recorded sequentially and continuously. In the random recording mode, the user data is randomly recorded. In the user data area A, sections 1001 through 1007 denote predetermined units of data in which the verify-after-write method is performed. A recording apparatus records user data in section 1001, returns to the start of section 1001, and checks if the user data is appropriately recorded or a defect exists in section 1001. If a defect is detected in a portion of section 1001, the portion is designated as defect #1. The user data recorded in defect #1 is also recorded on a portion of the spare area B. Here, the portion of the spare area B in which data recorded in defect #1 is rewritten is called replacement #1. Next, the recording apparatus records user data in section 1002, returns to the start of section 1002, and checks whether the data is properly recorded or a defect exists in section 1002. If a defect is detected in a portion of section 1002, the portion is designated as defect #2. Likewise, replacement #2 corresponding to defect #2 is formed in the spare area B. Further, defect #3 and replacement #3 are designated in section 1003 of the user data area A and the spare area B, respectively. In section 1004, a defect does not occur and a defective area is not designated.

The recording apparatus records information regarding defect #1, #2, and #3 occurring in sections 1001 through 1004 as temporary defect information TDFL #0 in a TDMA, when recording operation #0 is expected to end, after the recording and verifying of data to section 1004 (i.e., when a user presses the eject button of a recording apparatus or recording of user data allocated in a recording operation is complete). Also, management information for managing temporary defect information TDFL #0 is recorded as temporary defect management information TDDS #0 in the TDMA.

When recording operation #1 starts, data is recorded in sections 1005 through 1007 and defects #4 and #5 and replacements #4 and #5 are formed in the user data area A and the spare area B, respectively, as explained for sections 1001 through 1004. If the second recording operation is expected to end, the recording apparatus records information regarding defects #4 and #5 as temporary defect information TDFL #1, and records the information contained in the defect information TDFL #1 once again. Thereafter, temporary management information for managing the temporary defect information TDFL #1 is recorded as temporary defect management information TDDS #1 in the TDMA.

Figure 8A:
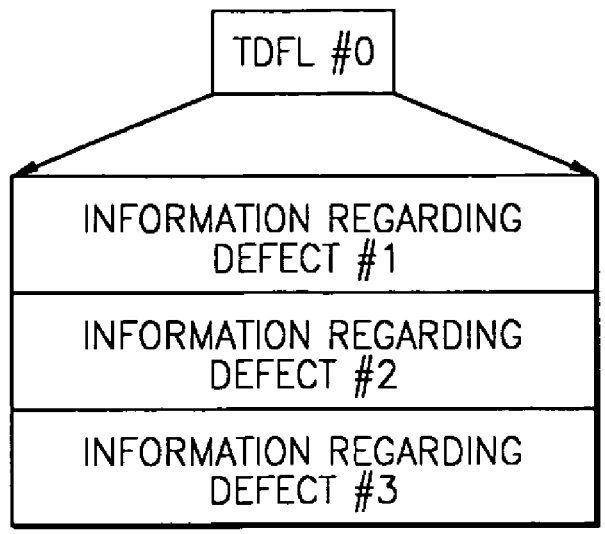
FIGS. 8A and 8B illustrate data structures of temporary defect information TDFL #0 and TDFL #1 recorded as illustrated in FIG. 7.
Figure 8B:
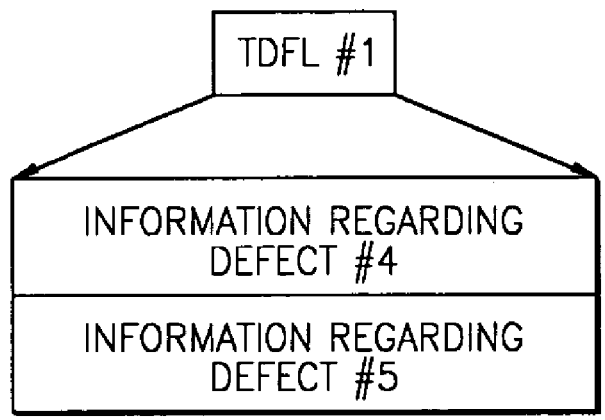
Figure 9:
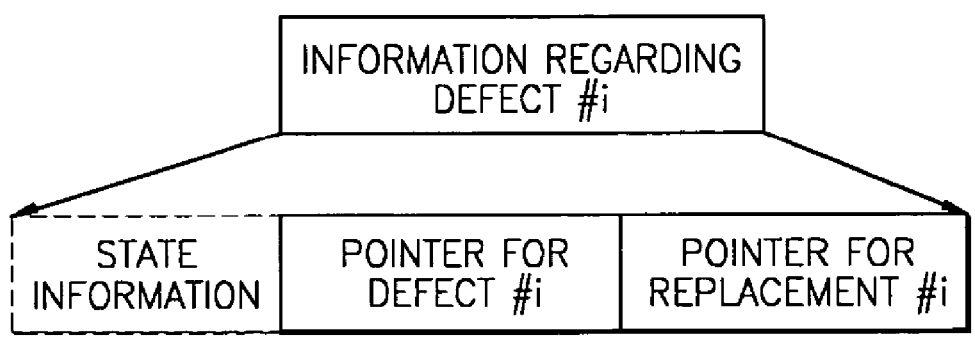
FIG. 9 illustrates a data structure of information regarding defect #i.

FIGS. 8A and 8B illustrate data structures of the temporary defect information TDFL #0 and #1 recorded as explained with respect to FIG. 7. FIG. 9 illustrates a data structure of information regarding defect #i recorded as explained with reference to FIG. 7. Referring to FIGS. 8A and 8B, the temporary defect information TDFL #0 describes defects detected during a recording operation #0. That is, the temporary defect information TDFL #0 contains information regarding defects #1, #2, and #3. The information regarding defect #1 indicates the position of an area in which defect #1 exists and the position of an area in which replacement #1 is recorded. The information regarding defect #2 indicates the position of an area in which defect #2 exists, and the position of an area in which replacement #2 is recorded. The information regarding defect #3 the position of an area in which defect #3 exists, and the position of an area in which replacement #3 is recorded.

Temporary defect information TDFL #1 describes only defects detected during a recording operation #1. That is, the temporary defect information TDFL #1 contains information regarding defects #4 and #5. Temporary defect information according to an aspect of the present invention describes only defects detected during a corresponding recording operation. For disc finalization, all of temporary defect information recorded in a TDMA must be read and written to a DMA. For this reason, as previously mentioned with reference to FIGS. 4A, 4B, 5A, and 5B, temporary defect management information contains both information regarding the location of corresponding temporary defect information and information regarding the location of temporary defect information recorded right before the corresponding temporary defect information. Accordingly, it is possible to more rapidly read all recorded temporary defect information than where all recorded temporary defect information is accumulatively recorded.

FIG. 9 illustrates a data structure of information regarding a defect #i according to an embodiment of the present invention. Referring to FIG. 9, the information regarding a defect #i describes a pointer to the defect #i and a pointer to a corresponding replacement #i. Further, while not required in all aspects, the information regarding the defect #i may further include state information that indicates whether the defect #i occurs in continuous defect blocks or a single defect block. The inclusion of the state information into the information regarding the defect #i is optional. If the defect #i occurs in the continuous defect blocks, the state information further represents whether the pointer for defect #i points to the start or end of the continuous defect blocks and whether the pointer for replacement #i points to the start or end of a replacement block that replaces defect #i. When the state information indicates the pointer for defect #i as the start of the continuous defect blocks and the pointer for replacement #i as the start of the replacement block, the pointer for defect #i represents a starting physical sector number of the continuous defect blocks and the pointer for replacement #i represents a starting physical sector number of replacement #i. In contrast, when the state information indicates the pointer for defect #i as the end of the continuous defect blocks and the pointer for replacement #i as the end of the replacement block, the pointer for defect #i represents an ending physical sector number of the continuous defect blocks and the pointer for replacement #i represents an ending physical sector number of replacement #i. The definition of at least two continuous defect blocks where defects exist using state information enables effectively recording of information and saves a space of recording, even if information regarding defects is not recorded in units of blocks. Here, the block denotes a logical record unit of data.

The pointer for defect #i specifies a starting and/or ending point(s) of defect #i. The pointer for defect #i may include a starting PSN of defect #i. The pointer for replacement #i specifies a starting and/or ending points of replacement #i. The pointer for replacement #i may also include a starting PSN of replacement #i.

Hereinafter, embodiments of a disc defect management method according to an aspect of the present invention using the recording unit 1 of FIG. 1 and the disc 100 according to the embodiment of the present invention shown in FIG. 3A, will be described with reference to the accompanying drawings.

Figure 10:
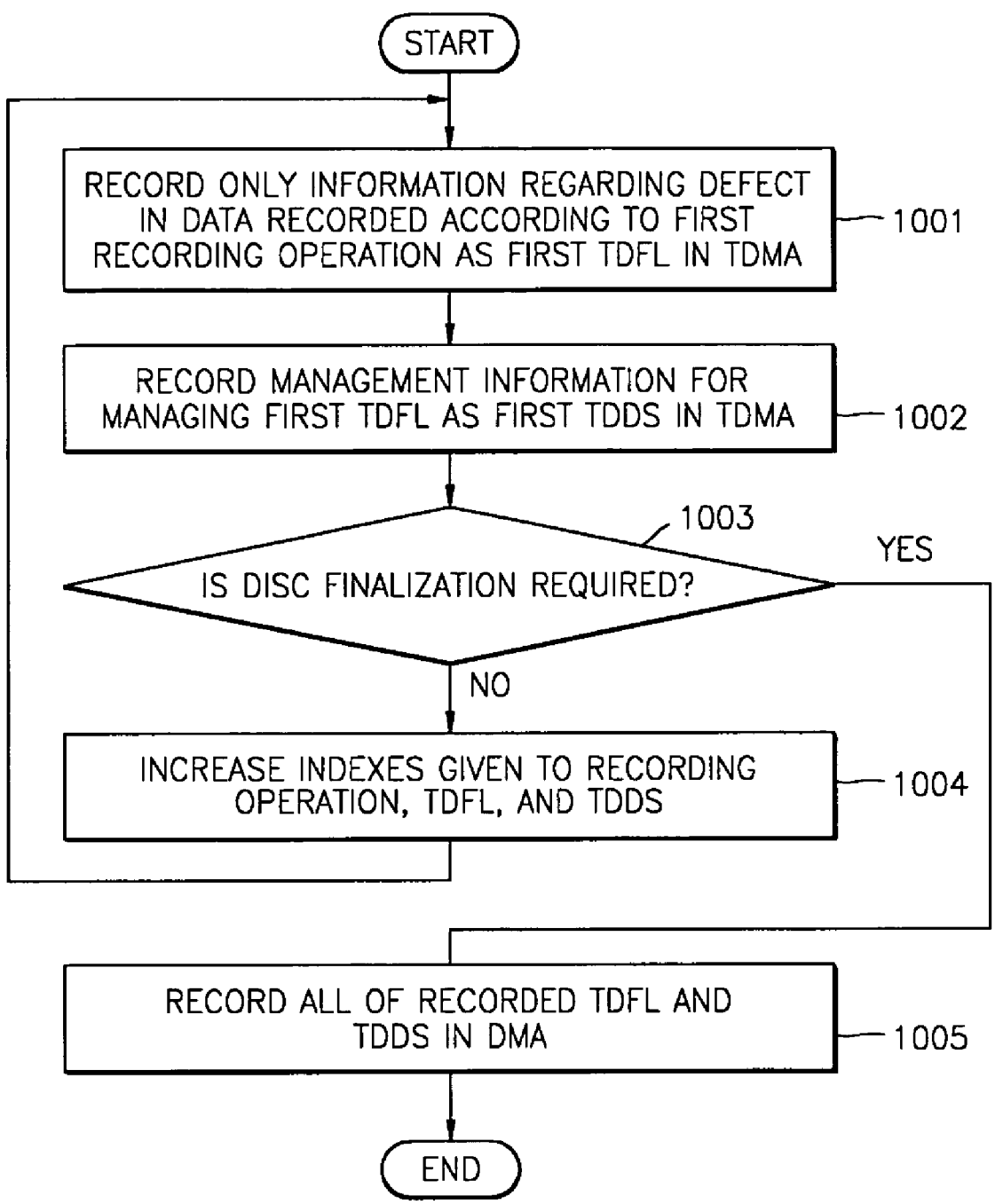
FIG. 10 is a flowchart illustrating a disc defect management method according to an embodiment of the present invention.

FIG. 10 is a flowchart illustrating a disc defect management method according to an embodiment of the present invention. Referring to FIG. 10, the recording apparatus of FIG. 1 records information regarding data, which is recorded according to a first recording operation, as first temporary defect information in a TDMA of a disc 100 (action 1001). This process serves to manage disc defects. The recording apparatus records temporary management information for managing the first temporary defect information as first temporary defect management information in the TDMA (action 1002). It is checked whether finalizing of the disc 100 is required (action 1003). If it is determined in action 1003 that the finalizing of the disc 100 is not required, actions 1001 and 1002 are repeated while increasing indexes given to each recording operation, temporary defect information, and temporary defect management information by 1 (action 1004). However, if it is determined in action 1003 that disc finalization is required, all of recorded temporary defect management information and temporary defect information are read and recorded in a DMA (action 1005). That is, all of the recorded temporary defect management information and temporary defect information are recorded as the final defect management information and final defect information in the DMA, respectively. The final defect information and final defect management information may be repeatedly recorded to increase the reliability of data detection. Further, the verify-after-write method may be performed on the final defect management information and final defect information. If a defect is detected from this information, an area of the disc 100 having the defect and the following area containing data may be regarded as being unavailable (i.e., the area is designated as a defective area), and the final defect management information and final defect information may be again recorded after the defective area.

Figure 11:
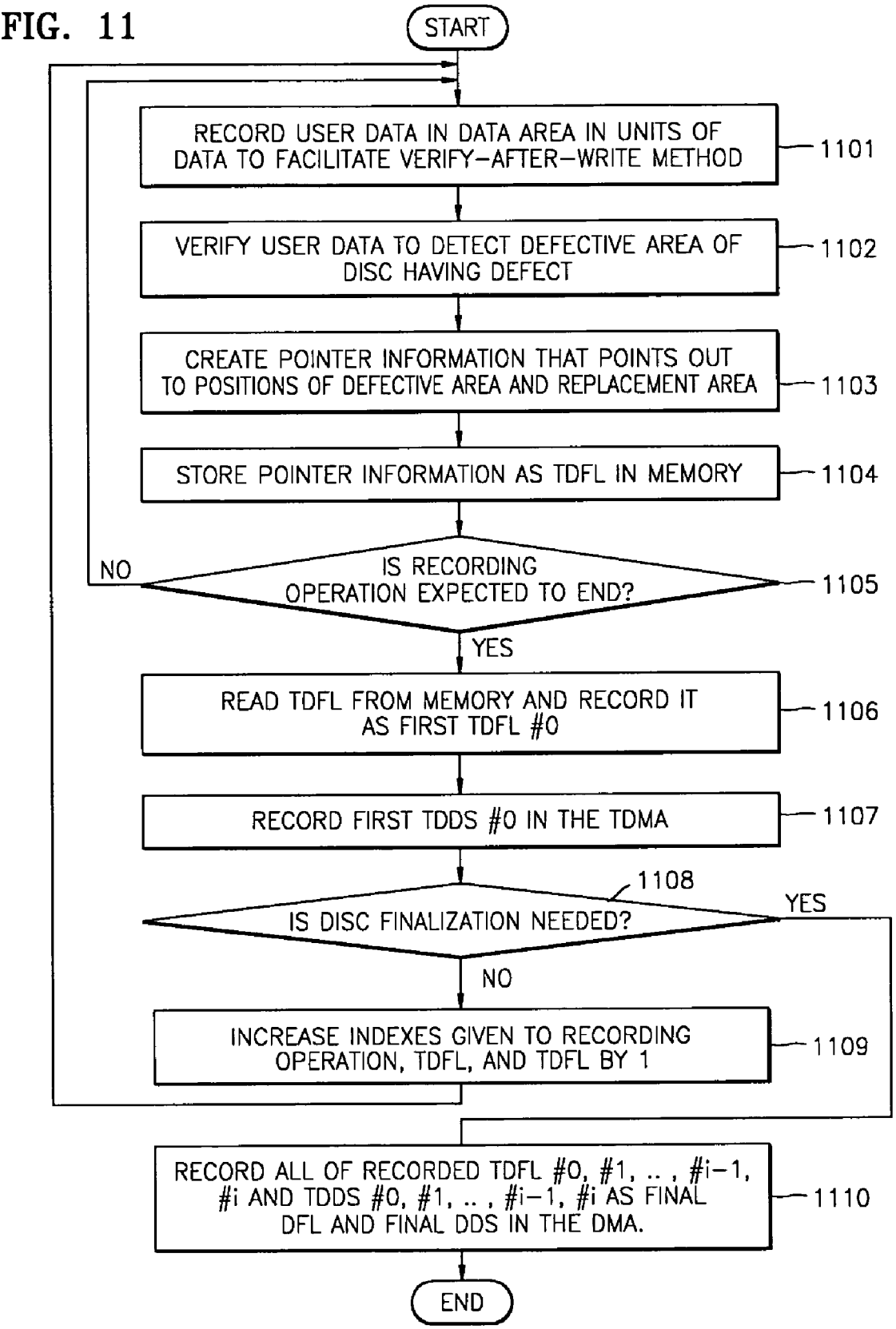
FIG. 11 is a flowchart illustrating a disc defect management method according to another embodiment of the present invention.

FIG. 11 is a flowchart illustrating a disc defect management method according to an embodiment of the present invention. Referring to FIG. 11, the recording apparatus of FIG. 1 records user data in a data area of a disc 100 in units of data to facilitate the verify-after-write method (action 1101). The data recorded in action 1101 is verified to detect an area of the disc 100 having a defect (action 1102). The controller 2 of FIG. 1 designates the area having the defect as a defective area, controls the recording/reading unit 1 to rewrite data recorded in the defective area to a spare area so as to create a replacement area, and creates pointer information specifying the positions of the defective area and the replacement area (action 1103). The pointer information is recorded as first temporary defect information in the memory 3 of FIG. 1 (action 1104). The first temporary defect information may further include state information describing whether the defect occurs in a single defect block or continuous defect blocks. It is checked whether a current recording operation is expected to end (action 1105). If it is determined in action 1105 that the recording operation is not expected to end, actions 1101 through 1104 are repeated until the recording operation ends.

If it is determined in action 1105 that the recording operation is likely to end (i.e., when the recording of the user data is completed according to a user input or according to the first recording operation), the controller 2 controls the recording/reading unit 1 to read the first temporary defect information from the memory 3 and record the first temporary defect information as first temporary defect information TDFL #0 in a TDMA (action 1106). Management information for managing the first temporary defect information TDFL #0 is recorded as first temporary defect management information TDDS #0 twice in the TDMA, the first temporary defect management information TDDS #0 recorded right after the first temporary defect information TDFL #0 (action 1107). It is understood that the number of times of recording temporary defect management information and temporary defect information are not limited. It is checked whether disc finalization is required (action 1108). If it is determined in action 1108 that disc finalization is not required, actions 1101 through 1107 are repeated. Whenever actions 1101 through 1107 are repeated, indexes given to a recording operation, temporary defect information, and temporary defect management information are increased by 1 (action 1109). However, temporary defect information TDFL #1 specifies only information regarding a defect detected during a recording operation #1. That is, temporary defect information TDFL #1 does not contain information regarding defects detected during the previous recording operation #0. Further, the temporary defect management information TDDS #1 describes the location of corresponding temporary defect information TDFL #1 and the location of temporary defect information TDFL #0 recorded right before the temporary defect information TDFL #1.

If it is determined in action 1108 that disc finalization is needed, all of recorded temporary defect information TDFL #0, #1, #i−1, #i and temporary defect management information TDDS #0, #1, . . . , #i−1, #i are recorded as the final defect information DFL and the final defect management information DDS in the DMA, respectively (action 1110). The final defect information DFL and the final defect management information DDS may be repeatedly recorded several times to increase the reliability of data detection. Similarly, the verify-after-write method may be performed on the final defect information and defect management information. If a defect is detected in this information, an area of the disc having the defect and the following area containing data may be regarded as being unavailable (i.e., the area is designated as a defective area), and the final defect management information and defect information may be again recorded after the defective area.

Figure 12A:
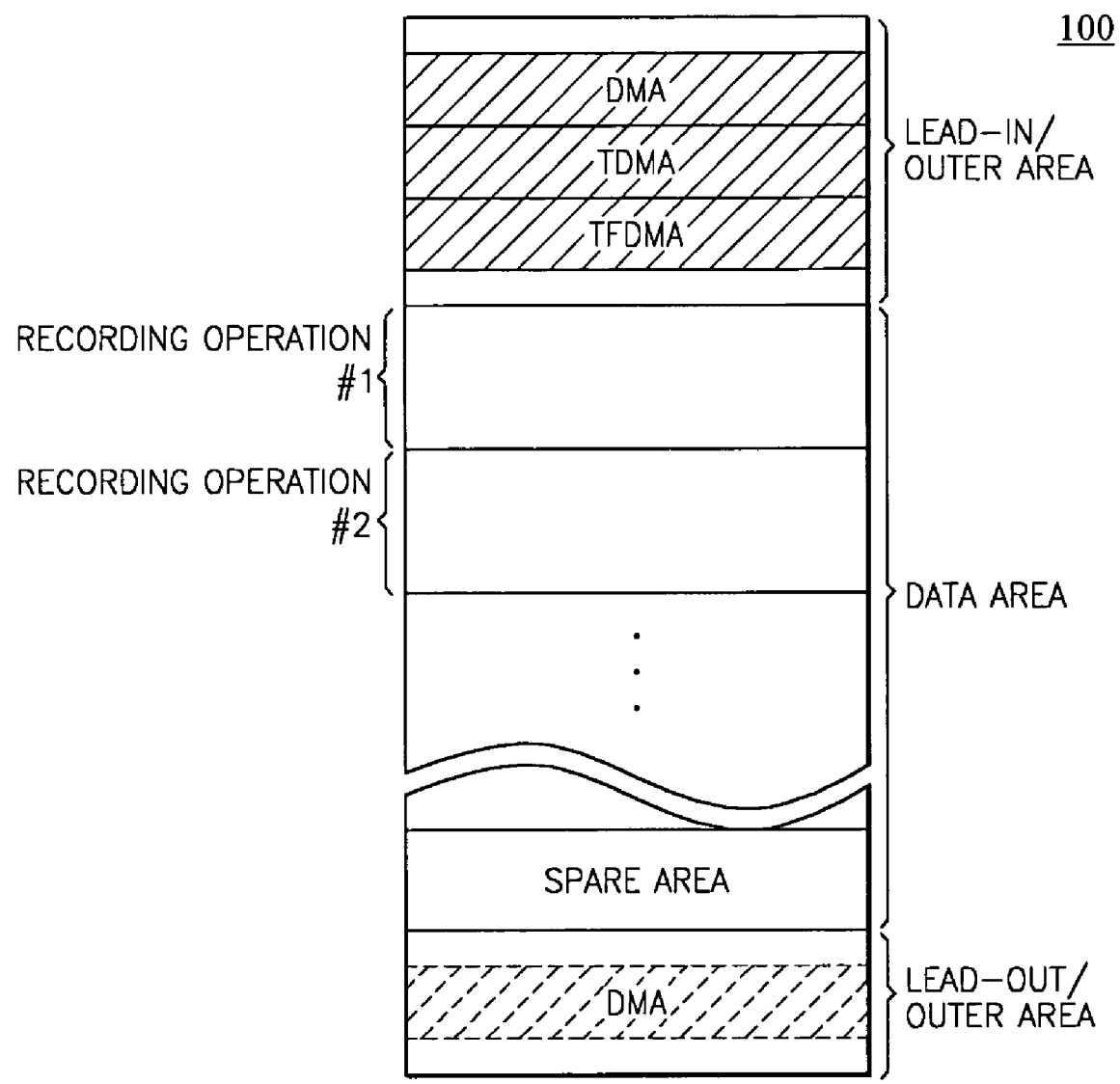
FIG. 12A illustrates a data structure of a disc according to another embodiment of the present invention.

FIG. 12A illustrates a data structure of the disc 100 of FIG. 2 according to another embodiment of the present invention. Referring to FIG. 12A, if the disc 100 is a single record layer disc shown in FIG. 2A, a defect management area (DMA), a temporary defect management area (TDMA), and a temporary finalized defect management area (TFDMA) are formed in a lead-in area of the disc 100. Further, the DMA may be further formed in a lead-out area. Alternatively, the lead-out area may include the TDMA and the TFDMA. That is, the DMA, the TDMA, and the TFDMA may be present in at least one of the lead-in area and the lead-out area. If the disc 100 is a double record layer disc shown in FIG. 2B, the DMA, the TDMA, and the TFDMA are present in a lead-in area and a lead-out area that are located at an inner part of the disc 100, respectively. The DMA may further be included in the lead-out area and an outer area that are located at an outer part of the disc 100. Accordingly, the DMA and the TDMA are present in at least one of the lead-in area, the lead-out area, and the outer area.

According to this embodiment and as similarly explained in the embodiment shown in FIG. 3A, the temporary defect management information and the temporary defect information (which together constitute temporary management information) are recorded in the TDMA. The TDMA is allotted to the lead-in area and/or the lead-out area, being separated from the DMA. If the temporary defect information is recorded more than a predetermined number of times, all recorded temporary defect information is read from the TDMA and recorded in the TFDMA. If defect information is required, for example, to reproduce user data recorded in a data area of the disc 100 even before disc finalization, considerable time may be spent reading all temporary defect information from separate areas. Therefore, even before disc finalization, the recorded temporary defect information is read from the separate areas and recorded in the same area, thereby reducing the amount of time spent reading the defect information.

During the disc finalization, all recorded temporary defect information and temporary defect management information are recorded as final information in the DMA. In this embodiment, since disc defect management is performed using the linear replacement method, the temporary defect information includes information indicating the position of an area of the disc 100 having a defect and information indicating the position of an area of the disc 100 that is replacement for the area having the defect. The temporary defect management information is used to manage the temporary defect information and includes information regarding the location of the temporary defect information recorded on the disc 100.

In this embodiment, the temporary defect information and temporary defect management information are recorded every time a recording operation ends. In the TDMA, information regarding a defect, which occurs in data recorded during recording operation #1 and information regarding a replacement area are recorded as temporary defect information TDFL #1. Information regarding a defect, which occurs in data recorded during recording operation #2, and information regarding a replacement area are recorded as temporary defect information TDFL #2. Further, management information for managing temporary defect information TDFL #1, #2 is recorded as temporary defect management information TDDS #1, #2 in the TDMA. the management information specifies the locations of the temporary defect information TDFL #1, #2 according to an aspect of the invention. In this embodiment, defect information contained in previously recorded temporary defect information TDFL #1, #2, and #i−1 is not included in the temporary defect information TDFL #i. That is, only information regarding a defect detected from a recording area during a corresponding recording operation #i is included in the temporary defect information TDFL #i. Accordingly, the amount of information regarding defects can be minimized, thus enabling effectively use of a recording area of the TDMA. In other words, the recording area of the lead-in area (or the lead-out area or the outer area) including the TDMA is smaller than a data area where user data is recorded. Nevertheless, if information regarding a defect detected whenever a recording operation is performed is recorded to include all information regarding defects detected during previous recording operations, data may not further be recorded in the TDMA before the data area is full with data. For this reason, in this embodiment, only defect information for a related recording operation is recorded as temporary defect information.

When the number of times of recording the temporary defect information reaches a predetermined number k, all of the recorded temporary defect information is written to the TFDMA. If necessary, all of the temporary defect information recorded is recorded as temporary finalized defect management information in the TFDMA even before disc finalization, thereby accelerating data reading.

When additional data cannot be recorded or will not be recorded in the data area (that is, disc finalization is required), the defect information recorded in the temporary defect information area and the defect management information recorded in the TDMA are recorded in the DMA. For the disc finalization, all of the information regarding defects contained in the recorded temporary defect information #1, #2, #i must be read and written to the DMA. For this reason, temporary finalized defect management information that is last recorded in the TFDMA is first read. Then, the other temporary defect information is read from the TDMA. Thus, it is possible to more rapidly obtain desired information than se where the TFDMA does not exist.

Meanwhile, the verify-after-write can be performed on the temporary defect information TDFL #i and the temporary defect management information TDDS #i, respectively. When a defect is detected, information recorded in an area of a disc having a defect may be either recorded in a spare area using linear replacement, or recorded in an area adjacent to the TDMA using slipping replacement.

Figure 12B:
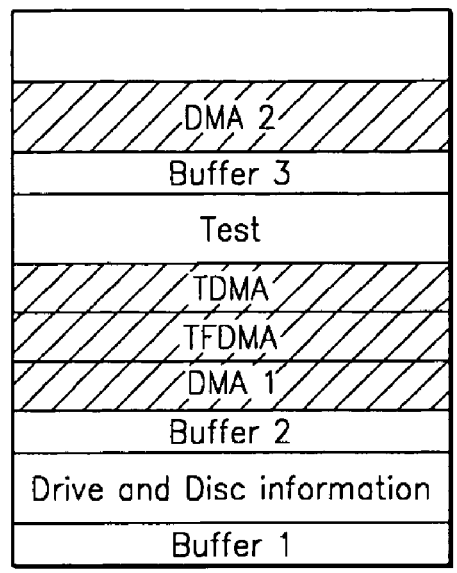
FIG. 12B illustrates a data structure of a disc with DMAs, a TDMA, and a temporary finalized DMA (TFDMA) shown in FIG. 12A.

FIG. 12B illustrates a data structure of a disc with a TDMA, DMAs, and a TFDMA shown in FIG. 12A. Referring to FIG. 12B, two DMAs (i.e., DMA #1 and DMA #2) are formed to increase the robustness of defect management information and defect information. However, it is understood that a single DMA can be used, and that more than two DMAs can be used. TDMA denotes a temporary defect management area, TFDMA denotes a temporary finalized defect management area; Test denotes an area in which recording conditions of data are measured; Drive and Disc information is an area in which information regarding a drive used during a recording and/or reproducing operation (s), disc information, and information regarding disc finalization are recorded; and Buffer 1, Buffer 2, and Buffer 3 are buffers indicating borders of the respective areas.

Figure 13:
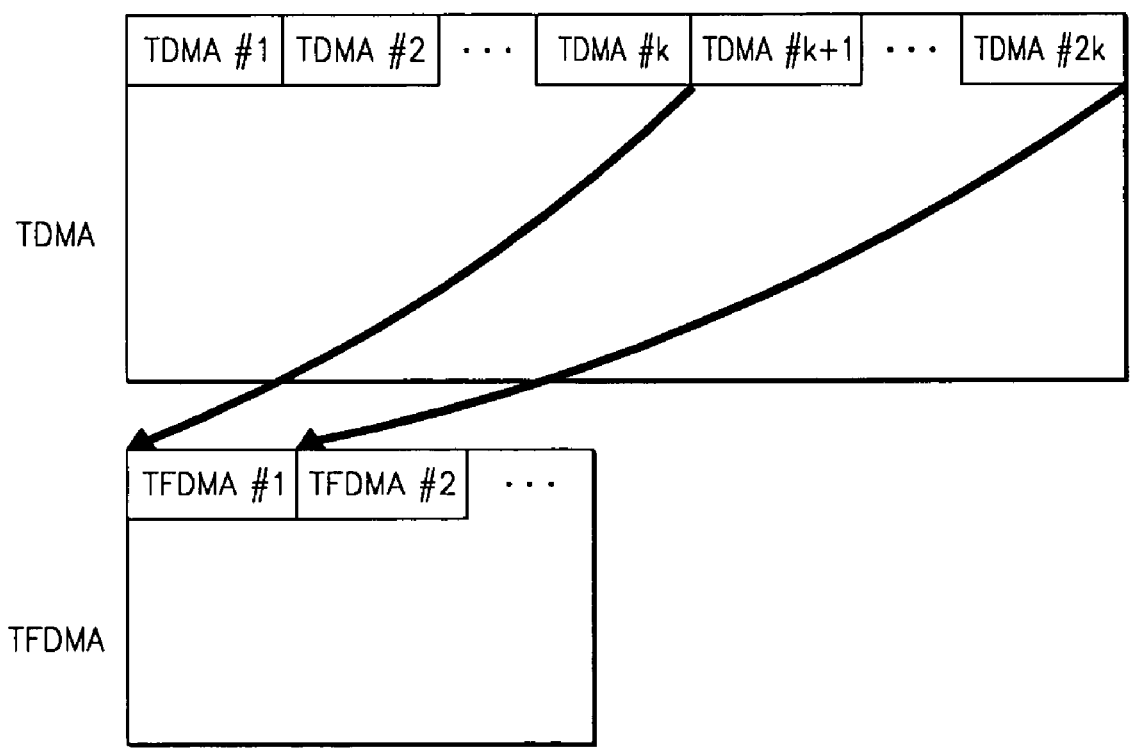
FIG. 13 is a reference diagram illustrating the relationship between a TDMA and a TFDMA, according to an embodiment of the present invention.

FIG. 13 is a reference diagram illustrating the relationship between a TDMA and a TFDMA according to an aspect of the present invention. Referring to FIG. 13, when recording temporary defect information and temporary defect management information are recorded as temporary management information a predetermined number of times (i.e., k), all of the recorded temporary management information is collected and recorded as temporary finalized defect management information in the TFDMA. For instance, when temporary defect management information is recorded k times (i.e., the temporary management information TDMA #1, #2, . . . , #k are recorded), in the TDMA, all of the temporary management information TDMA #1, #2, . . . , #k are collected and recorded as temporary finalized defect management information TFDMA #1 in the TFDMA. Later, when temporary management information is again recorded k times (i.e., the temporary management information TDMA #k+1, #k+2, #2k are recorded), all of the temporary management information TDMA #k+1, #k+2, #2k are collected and recorded as temporary finalized defect management information TFDMA #2 in the TFDMA.

The temporary finalized defect management information TFDMA #1 includes all of the temporary defect information contained in the temporary management information TDMA #1, #2, #k×n, and further includes information regarding the recording position of next temporary management information TDMA #k×n+1. Therefore, even before disc finalization, the recording/reading unit 1 reads all the temporary defect information included in a last recorded temporary finalized defect management information stored in the TFDMA, and reads all temporary defect information from next temporary management information stored in the TDMA based on the information regarding the location of the next temporary finalized defect management information from the last recorded temporary finalized defect management information. Accordingly, it is possible to more rapidly obtain defect information than where temporary finalized defect management information is not recorded.

A data structure of a TDMA according to the embodiment of the present invention shown in FIG. 12A may also be embodied as illustrated in FIGS. 4A through 4C. A data structure of temporary defect management information TDDS #i may be as shown in FIG. 5A. A data structure of a copy of the temporary defect management information TDDS #i may be as shown in FIG. 5B. A data structure of temporary defect information TDFL #i may be as shown in FIG. 6.

Figure 14A:
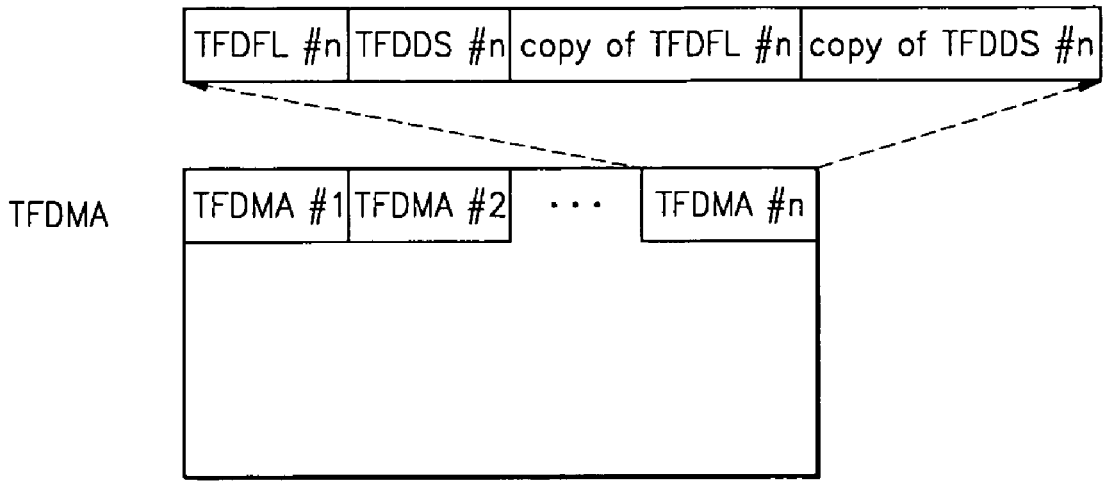
FIGS. 14A through 14D illustrate data structures of a TFDMA according to an embodiment of the present invention.

FIGS. 14A through 14D illustrate data structures of a TFDMA according to embodiments of the present invention. More specifically, FIG. 14A illustrates a data structure of a TFDMA according to an embodiment of the present invention. Referring to FIG. 14A, temporary finalized defect management information TFDMA #1, TFDMA #2, TFDMA #n are sequentially recorded starting from the start of the TFDMA. In the temporary finalized defect management information TFDMA #n, corresponding temporary finalized defect management information TFDDS #n and temporary finalized defect information TFDFL #n are included twice to increase the reliability and robustness of information. The temporary finalized defect management information TFDDS #n specifies the location of the corresponding temporary finalized defect information TFDFL #n and the location of defect information last recorded in temporary finalized defect information TFDFL #n. Let us assume that temporary defect management information is recorded k times and the temporary finalized defect management information TFDDS #n is recorded. In this case, the temporary finalized defect management information TFDDS #n describes the location of next temporary management information TDMA #k×n+1. A number of times of recording the temporary finalized defect management information TFDDS #n and the temporary finalized defect information TFDFL #n is not limited.

Figure 14B:
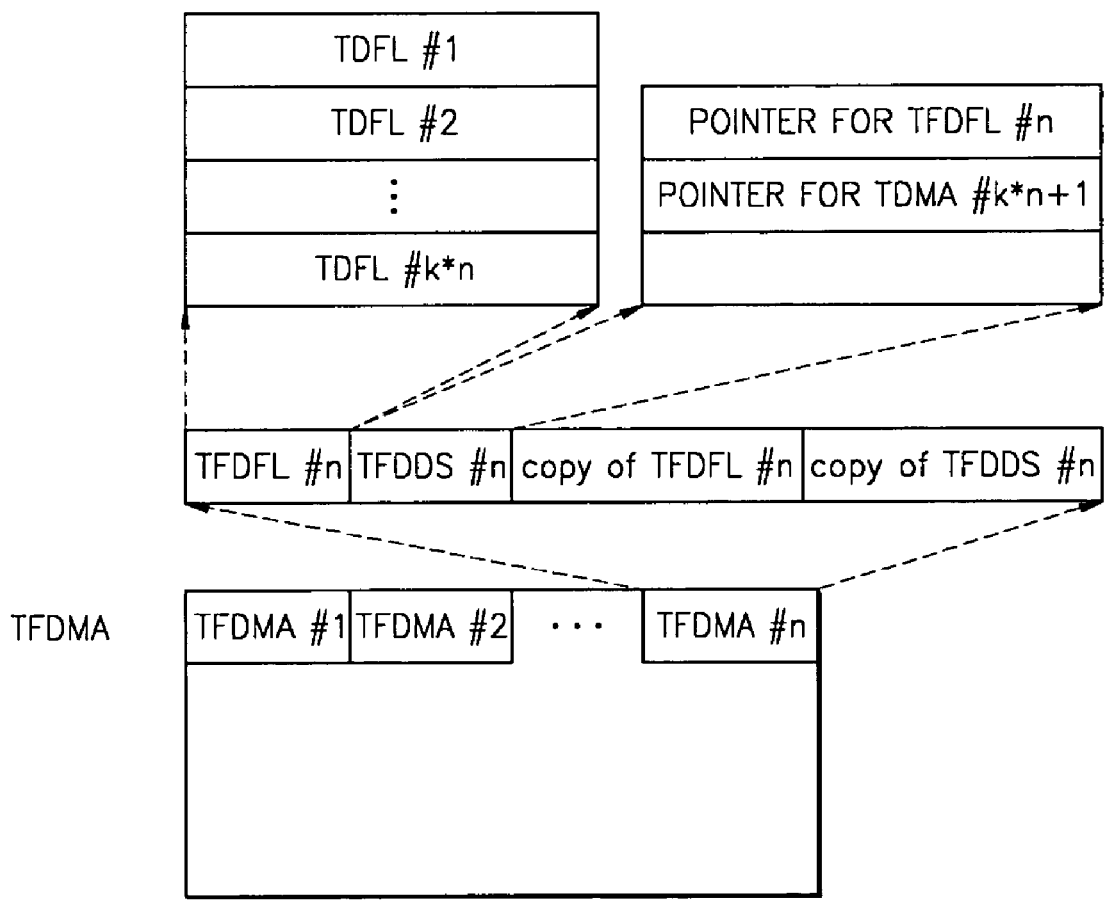

FIG. 14B illustrates a detailed data structure of the TFDMA of FIG. 14A. Referring to FIG. 14B, temporary finalized defect management information TFDMA #1, #2, . . . , #n is respectively recorded whenever temporary management information TDMA is recorded k times. Accordingly, temporary finalized defect information TFDFL #n further includes all of recorded temporary defect information TDFL #1, #2, #k×n. Temporary finalized defect management information TFDDS #n includes a pointer pointing to the location of corresponding temporary finalized defect information TFDFL #n and a pointer pointing to the location of next temporary management information TDMA #k×n+1. Here, k denotes an integer more than or equal to 2.

Figure 14C:
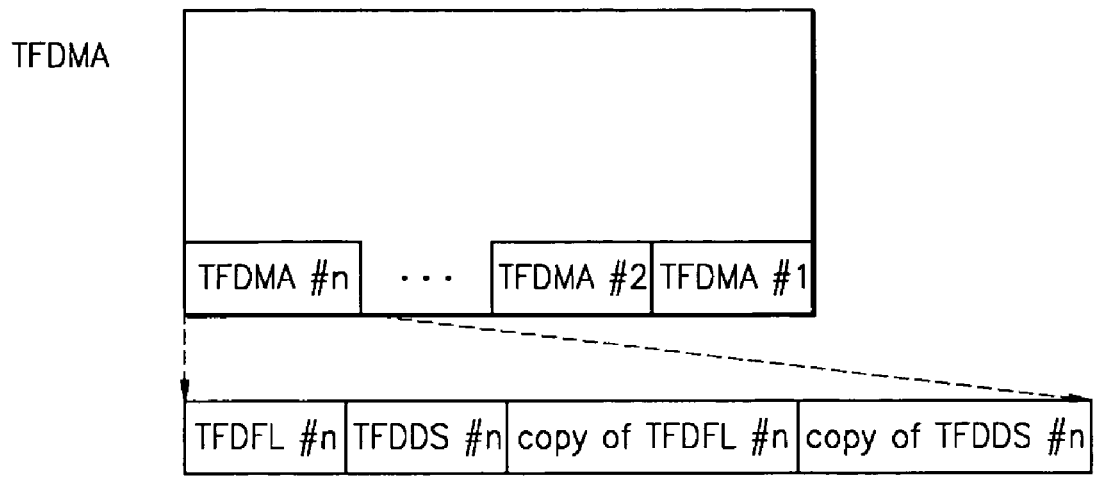

FIG. 14C illustrates a data structure of a TFDMA according to another embodiment of the present invention. Compared to FIG. 14A, the sequence of recording temporary finalized defect management information in the TDFMA of FIG. 14C is not the same. More specifically, temporary finalized defect management information TFDMA #1, TFDMA #2, TFDMA #n are sequentially recorded starting from the end of the TFDMA. In the temporary finalized defect management information TFDMA #n, corresponding temporary finalized defect management information TFDDS #n and temporary finalized defect information TFDFL #n are included twice to increase the reliability and robustness of information. The temporary finalized defect management information TFDDS #n specifies the location of the corresponding temporary finalized defect information TFDFL #n and the location of defect information that is last included in the temporary finalized defect information TFDFL #n. For instance, when temporary management information TDMA is recorded k times and the temporary finalized defect management information TFDDS #n is recorded, the temporary finalized defect management information TFDDS #n describes the location of next temporary management information TDMA #k×n+1. k denotes an integer that is 2 or greater.

A number of recording the temporary finalized defect management information TFDDS #n and the temporary finalized defect information TFDFL #n is not limited.

Figure 14D:
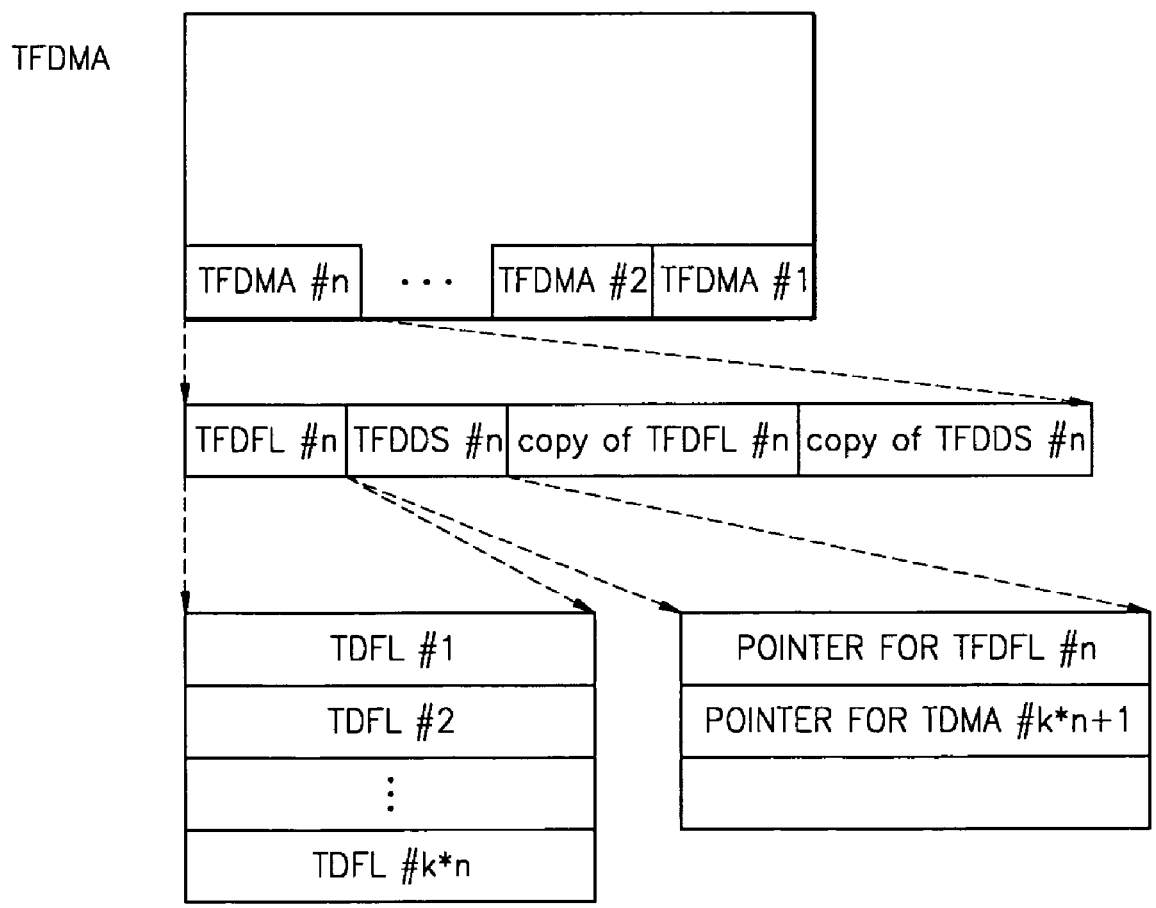

FIG. 14D illustrates a detailed data structure of the TFDMA of FIG. 14C. Referring to FIG. 14D, temporary finalized defect management information TFDMA #1, #2, #n is respectively recorded whenever temporary management information TDMA is recorded k times. In this case, temporary finalized defect information TFDFL #n further includes all of recorded temporary defect information TDFL #1, #2, . . . , #n. The temporary finalized defect management information TFDDS #n includes a pointer pointing to the location of corresponding temporary finalized defect information TFDFL #n and a pointer pointing to the location of next temporary management information TDMA #k×n+1. Here, k denotes an integer more than or equal to 2.

In this embodiment, a process of recording data in a user data area and a spare area is as illustrated in FIG. 7. Also, data structures of temporary defect information TDFL #0 and #1 recorded as illustrated in FIG. 7, are as shown in FIGS. 8A and 8B, respectively. A data structure of a defect #i is as shown in FIG. 9.

Figure 15:
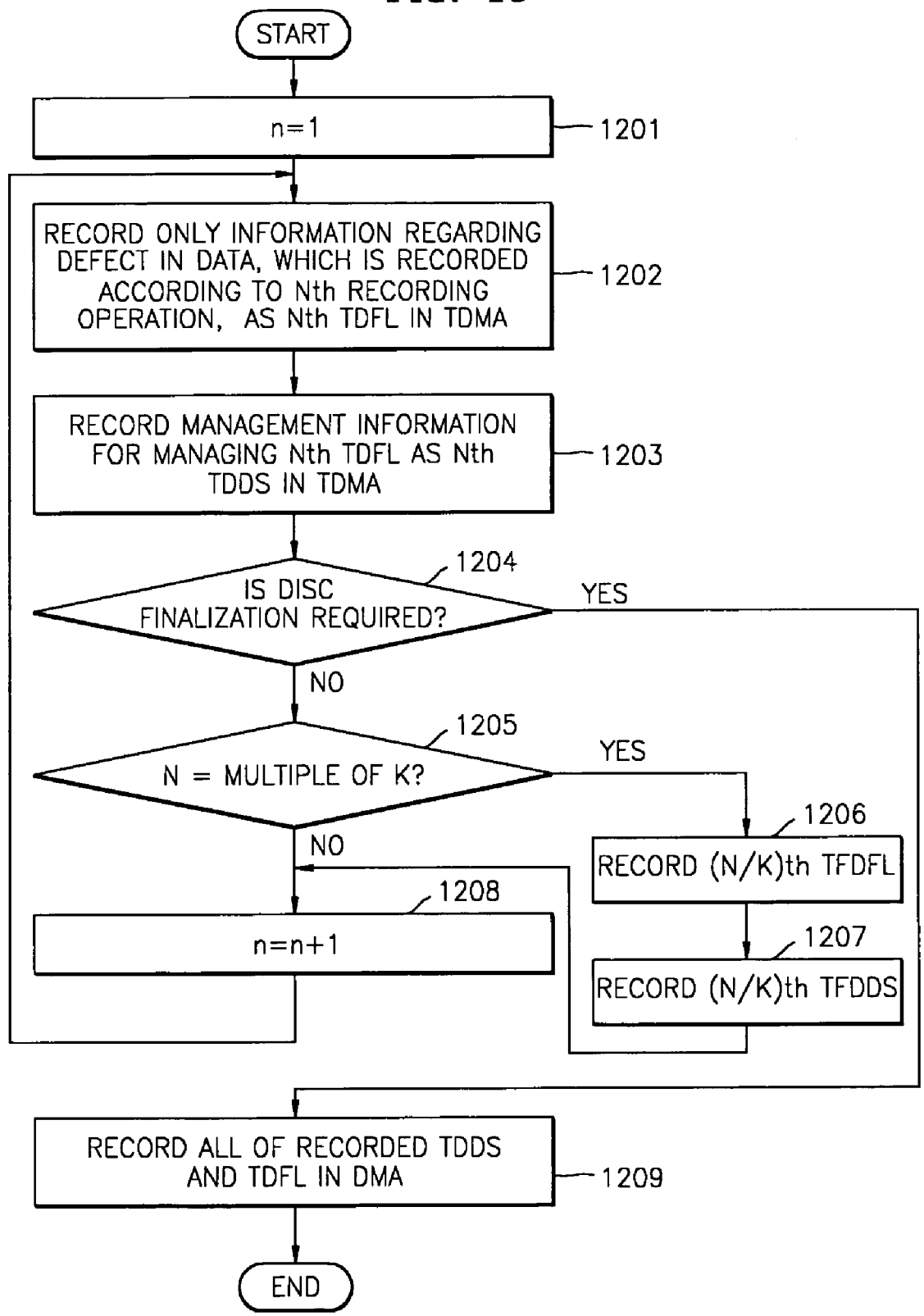
FIG. 15 is a flowchart illustrating a disc defect management method according to a yet another embodiment of the present invention.

Hereinafter, embodiments of disc defect management according to the present invention using the recording apparatus of FIG. 1 and the disc 100 of FIG. 12A will be described. FIG. 15 is a flowchart illustrating a disc defect management method according to an embodiment of the present invention. Referring to FIG. 15, n is set to 1 in the recording apparatus of FIG. 1 (action 1201). Here, n is a variable that denotes an order of a recording operation and is an integer that is equal to or more than 1. Next, for disc defect management, only information regarding a defect in data recorded according to an nth recording operation is recorded as nth temporary defect information in a temporary defect management area (TDMA) (action 1201). Next, management information for managing the nth temporary defect information is recorded as nth defect management information in the TDMA (action 1203). Corresponding temporary defect information and temporary defect management information may be recorded as a pair of information in the TDMA in units of a predetermined number of blocks, (e.g., in a block).

Next, whether disc finalization is required is checked (action 1204). If it is determined in action 1204 that disc finalization has yet to be required, whether n is a multiple of k is checked (action 1205). If n is not a multiple of k, actions 1202 through 1203 are repeated while increasing n by 1 (action 1208). When n is determined to be a multiple of k in action 1205, all of recorded temporary defect information is recorded as $n/k^{th}$ temporary finalized defect information in a temporary finalized defect management area (TFDMA) (action 1206). Next, management information for managing the $n/k^{th}$ temporary finalized defect information and information regarding the location of next temporary defect information (and/or temporary defect management information) are recorded as $n/k^{th}$ temporary finalized defect management information in the TFDMA (action 1207). Next, actions 1202 through 1203 are repeated while increasing n by 1 until n is a multiple of k, before next disc finalization.

If it is determined in action 1204 that disc finalization is required, all of the recorded temporary defect management information and temporary defect information are read from the TFDMA and the TDMA and recorded in the DMA (action 1209). More specifically, all temporary defect information included in temporary finalized defect management information that is last recorded in the TFDMA is read. Then, the locations of the other temporary defect information recorded in the TDMA are detected based on the last recorded temporary defect finalized management information so as to read the other temporary defect information. Next, all of the recorded temporary defect management information and temporary defect information are recorded as final defect management information and defect information in the DMA, respectively. The final defect management information and the final defect information may be recorded repeatedly to increase the reliability of information. Also, the verify-after-write method can be performed on the final defect management information and the final defect information. If a defect is detected, an area of the disc 100 having the defect and the following area containing data may be regarded as being unavailable (i.e., the area is designated as a defective area), and the final temporary defect management information and temporary defect information may be again recorded after the defective area.

Figure 16:
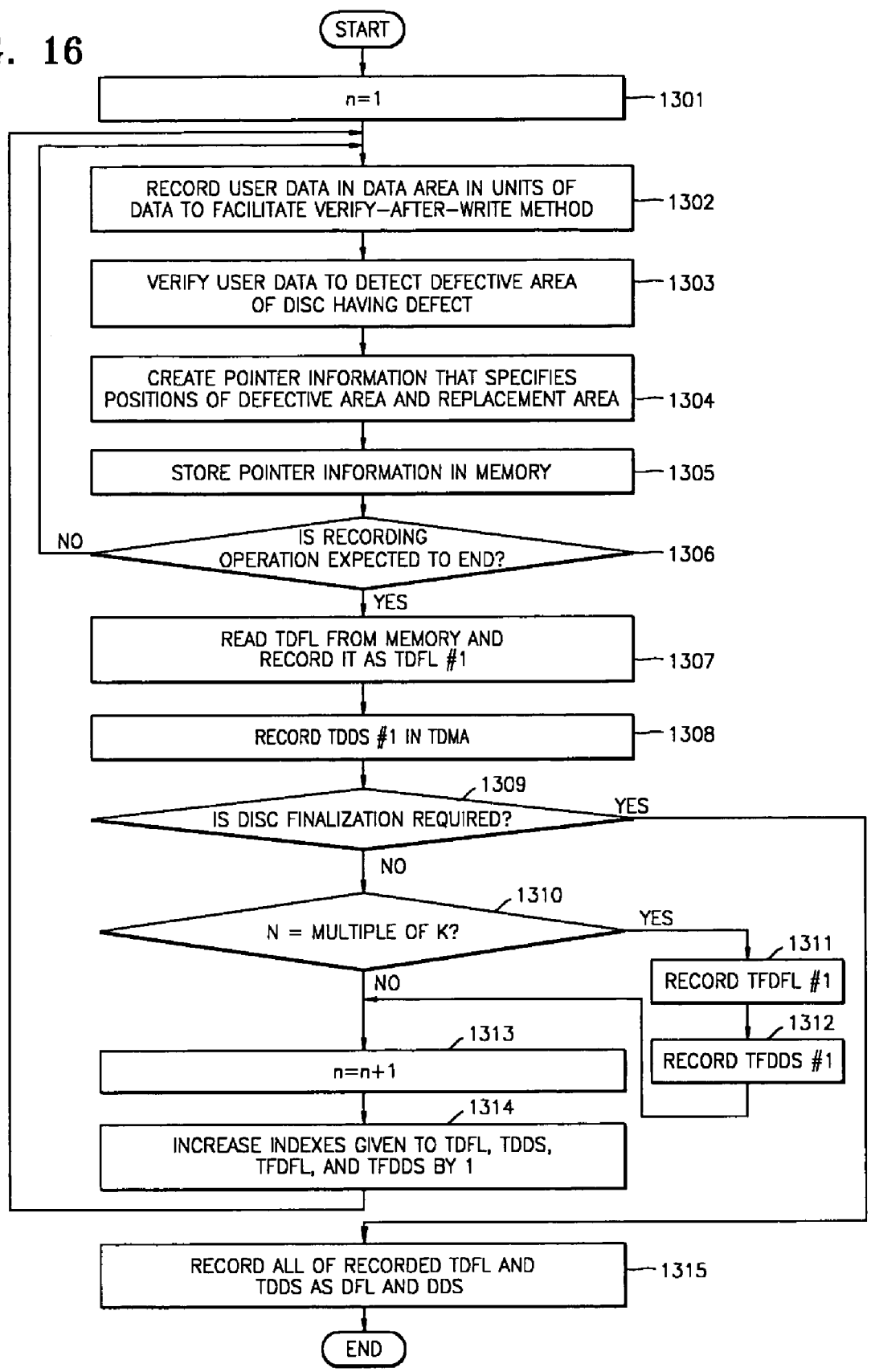
FIG. 16 is a flowchart illustrating a disc defect management method according to still another embodiment of the present invention.

FIG. 16 is a flowchart illustrating a disc defect management method according to an embodiment of the present invention. Referring to FIG. 16, n is set as 1 in the recording apparatus of FIG. 1 (action 1301). The recording apparatus records user data in a data area of the disc 100 in units of data to facilitate the verify-after-write method (action 1302). Next, the data recorded in action 1302 is verified to detect an area of the disc 100 having a defect (action 1303). The controller 2 of FIG. 1 designates the area having the defect as a defective area, controls the recording/reading unit 1 to rewrite data recorded in the defective area to a spare area so as to create a replacement area, and creates pointer information that points to the positions of the defective area and the replacement area (action 1304). The pointer information is recorded as temporary defect information in the memory 3 of FIG. 1 (action 1305). The temporary defect information may further include state information describing whether the defect occurs in a single defect block or continuous defect blocks. It is checked whether a current recording operation is expected to end (action 1306). If it is determined in action 1306 that the recording operation is not expected to end, actions 1302 through 1305 are repeated.

If it is determined in action 1306 that the recording operation is likely to end, (i.e., when the recording of the user data is complete by user input or according to the first recording operation), the controller 2 controls the recording/reading unit 1 to read the temporary defect information from the memory 3 and record it as temporary defect information TDFL #1 in a TDMA (action 1307). Temporary defect management information TDDS #1 is recorded as management information for managing the temporary defect information TDFL #1 twice right after the temporary defect information TDFL #1 (action 1308). The numbers of recording temporary defect management information and temporary defect information are not limited. Corresponding temporary defect information and temporary defect management information may be recorded as a pair of information in the TDMA in units of a predetermined number of blocks (e.g., in a block).

Next, it is checked whether disc finalization is required (action 1309). If it is determined in action 1309 that disc finalization is not required, actions 1302 through 1308 are repeated while increasing n by 1 (action 1313). Whenever actions 1302 through 1308 are repeated, indexes given to temporary defect information, temporary defect management information, temporary finalized defect information, and temporary finalized defect management information are increased by 1 (action 1314). However, temporary defect information TDFL #i specifies only information regarding defects detected during a recording operation #i (that is, it does not contain information regarding defects detected during the previous recording operations #1, #2, #i−1).

If n is determined to be a multiple of k in action 1310, all recorded temporary defect information is recorded as temporary finalized defect information TFDFL #1 even before disc finalization (action 1311). Next, management information for managing the temporary finalized defect information TFDFL #1 and information regarding the location of next temporary defect information TDFL (and/or temporary defect management information TDDS) are recorded as temporary finalized defect management information TFDDS #1 (action 1312). Also, whenever n is a multiple of k before disc finalization is required, actions 1311 and 1312 are repeated while increasing indexes given to temporary finalized defect information TFDFL and temporary defect management information TDDS by 1.

If it is determined in action 1309 that the finalizing of the disc 100 is needed, all recorded temporary defect information TDFL and temporary defect management information TDDS are read from the TDMA and a TFDMA and recorded as final defect information DFL and defect management information DDS in the DMA, respectively (action 1315). The final defect information DFL and the final defect management information DDS may be repeatedly recorded several times to increase the reliability of data detection. Similarly, the verify-after-write method may be performed on the final defect information and defect management information. If a defect is detected in this information, an area of the disc having the defect and the following area containing data may be regarded as being unavailable (i.e., the area is designated as a defective area), and the final temporary defect management information and temporary defect information may be again recorded after the defective area.

As described above, an aspect of the present invention provides a disc defect management method that is applicable to write once discs. A write once disc according to an embodiment of the present invention includes a temporary defect management area (TDMA) where information regarding defects (i.e., defect information) detected during respective recording operations is recorded. Therefore, during disc finalization, all defect information is read from the TDMA and recorded in a defect management area (DMA) at once, thus enabling effective use of a defect management area of the write once disc. In particular, temporary defect management information specifies both the location of corresponding temporary defect information and the location of temporary defect information recorded right before the corresponding temporary defect information. For this reason, it is possible to accelerate reading of all recorded temporary defect information. In the case of a write once disc, since disc defect management can also be performed while recording use data, a backup operation can be completed without interruptions. Also, since defect information is recorded in a temporary defect information area in recording operation units, it is possible to more effectively use a recording space than where defect information is accumulatively recorded for every recording operation. Thus, disc defect management can be performed on a data area even if the TDMA is not large.

A write once disc according to another embodiment of the present invention includes a TDMA and a temporary finalized defect management area (TFDMA). Information regarding defects (i.e., defect information) detected during each recording operation is recorded in the TDMA. When defect information is recorded a predetermined number of times in the TDMA, all recorded defect information is collected and recorded in the TFDMA. Also, information regarding the recording location of next defect information to be recorded in the TDMA is further recorded in the TFDMA even before disc finalization, thereby enabling fast reading of the defect information. During disc finalization, all temporary defect information recorded in the TDMA and the TFDMA is read and recorded in a DMA at once, thus enabling effective use of the DMA.

While not required in all aspects of the invention, it is understood that the controller 2 can be a computer implementing the method using a computer program encoded on a computer readable medium. The computer can be implemented as a chip having firmware, or can be a general or special purpose computer programmable to perform the method. It is further understood that the method can be used with optical media, such as CD-R, DVD-R, Blu-ray and Advanced Optical Discs (AODs).

While this invention has been particularly shown and described with reference to embodiments thereof, it will be understood by those skilled in the art that various changes in form and details may be made therein without departing from the spirit and scope of the invention as defined by the appended claims and their equivalents.

What is claimed is:

1. A write once disc, comprising:
   at least one record layer on which data is recorded;
   a temporary defect management area having first temporary defect information regarding only a defect in the recorded data detected during a corresponding first recording operation other than a prior recording operation, and first temporary defect management information for managing the first temporary defect information; and
   at least one defect management area in which the temporary defect information and temporary defect management information recorded in the temporary defect management area are recorded as defect information and defect management information, respectively,
   wherein the defect information and defect management information and/or the temporary defect information and temporary defect management information are used by a recording and/or reproducing apparatus to perform defect management with respect to the data recorded on the at least one record layer.

2. The write once disc of claim 1, wherein the at least one defect management area comprises at least two defect management areas.

3. The write once disc of claim 1, wherein the temporary defect information and temporary defect management information are recorded as a pair of information adjacent to each other in the temporary defect management area.

4. The write once disc of claim 3, wherein the temporary defect information and temporary defect management information are recorded several times, and the temporary defect management information includes information regarding a location of corresponding temporary defect information.

5. The write once disc of claim 3, wherein the temporary defect management information includes information regarding a location of previous temporary defect information recorded in the prior recording operation before the first temporary defect information.

6. The write once disc of claim 1, further comprising a replacement area in which a replacement is recorded to replace the defect in the recorded data, wherein the temporary defect information includes a pointer pointing to a location of the defect and a pointer pointing to a location of the replacement for the defect.

7. The write once disc of claim 6, wherein the temporary defect information further includes state information specifying and distinguishing between whether the defect occurs in one of continuous defect blocks and a single defect block.

8. The write once disc of claim 7, wherein the state information specifies that the defect occurs in the continuous defect blocks and that the pointer for the defect and the pointer for the replacement indicate starting positions of the defect and the replacement, respectively.

9. The write once disc of claim 7, wherein the state information specifies that the defect occurs in the continuous defect block and that the pointer for the defect and the pointer for the replacement indicate end positions of the defect and the replacement, respectively.

10. A method of managing disc defects, comprising:
    recording only information regarding a defect detected in data, which is recorded in a data area of a disc during a recording operation having an index of i, where i is an integer, as ith temporary defect information in a temporary defect management area of the disc;
    recording management information for managing the ith temporary defect information as ith temporary defect management information in the temporary defect management area;
    repeating the recording temporary defect information and the recording the temporary defect management information at least once while increasing the index i given to the recording operation, the temporary defect information, and the temporary defect management information by 1 so as to record temporary defect information and temporary defect management information having only defect information for the corresponding one of the recording operations; and reading and writing all of the recorded temporary defect management information and temporary defect information in a defect management area of the disc.

11. The method of claim 10, wherein the reading and writing is performed after recording of data in the data area according to a last recording operation.

12. The method of claim 10, wherein the recording the temporary defect information and the recording the temporary defect management information comprises sequentially recording the temporary defect information and the temporary defect management information as a pair of information adjacent to each other, starting from an end of the temporary defect management area.

13. The method of claim 12, wherein the recording the temporary defect information and the recording the temporary defect management information comprises recording the temporary defect information and the temporary defect management information several times.

14. The method of claim 12, wherein the recording the temporary defect management information comprises recording information regarding a location of the temporary defect information corresponding to the temporary defect management information, and information regarding a location of temporary defect information recorded during another recording operation having the index of at least i−1.

15. The method of claim 10, wherein the recording the temporary defect information and the recording the temporary defect management information comprises recording the temporary defect information and the temporary defect management information sequentially as a pair of information adjacent to each other, starting from an end of the temporary defect management area.

16. The method of claim 15, wherein the recording the temporary defect information and the recording the temporary defect management information comprises recording the temporary defect information and the temporary defect management information several times.

17. The method of claim 15, wherein the recording the temporary defect management information comprises recording information regarding a location of the temporary defect information corresponding to the temporary defect management information, and information regarding a location of temporary defect information recorded during another recording operation having the index of at least i−1.

18. The method of claim 10, wherein the recording the temporary defect information comprises:

recording the data in predetermined units during the ith recording operation:

verifying the recorded data to detect a defective area of the disc where a defect exists;

storing information regarding the defective area and information regarding a replacement area for the defective area as the ith temporary defect information in a memory of a recording apparatus;

repeating the recording data in predetermined units and the verifying the recorded data at least once; and reading the information stored in the memory and writing the read information as the ith temporary defect information in the temporary defect management area when the recording operation ends.

19. A recording and/or reproducing apparatus comprising:
a recording/reading unit that records data on and/or reads data from a disc; and a controller that controls the recording/reading unit to record in a temporary defect management area temporary defect information regarding a defect detected from a portion of the data recorded in a data area of the disc in a corresponding one of recording operation units, and to record in the temporary defect management area temporary defect management information for managing the temporary defect information in the temporary defect management area, where the temporary defect information does not include information regarding another defect defected during a prior recording operation unit.

20. The recording and/or reproducing apparatus of claim 19, wherein the controller controls the recording/reading unit to record corresponding temporary defect information and temporary defect management information as a pair of information adjacent to each other.

21. The recording and/or reproducing apparatus of claim 19, wherein the controller controls the recording/reading unit to record corresponding temporary defect information and temporary defect management information in the temporary defect management area for each of the recording operation units, and to read all of recorded temporary defect information and temporary defect management information and to record the read temporary defect information and temporary defect management information in a defect management area during disc finalization.

22. A recording and/or reproducing apparatus comprising:
a recording/reading unit that records data on and/or reads data from a disc; and a controller that controls the recording/reading unit to record information regarding a defect detected from data, which is recorded in a data area of the disc according to recording operation having an index of i, where i is an integer as ith temporary defect information in a temporary defect management area; to record defect management information for managing the ith temporary defect information as ith temporary defect management information in the temporary defect management area; record data in the data area while increasing the index; given to a corresponding recording operation, a corresponding temporary defect information, and a corresponding temporary defect management information by 1; and to record all of the recorded temporary defect information and temporary defect management information in a defect management area during disc finalization.

23. The recording and/or reproducing apparatus of claim 22, wherein the controller controls the recording/reading unit to record data in the data area according to a last recording operation, and to record all of recorded temporary defect information and temporary defect management information as final defect information and defect management information, respectively, in the defect management area.

24. The recording and/or reproducing apparatus of claim 22, wherein the controller controls the recording/reading unit to sequentially record corresponding temporary defect information and temporary defect management information as a pair of information, starting from a start of the temporary defect management area.

25. The recording and/or reproducing apparatus of claim 22, wherein the controller controls the recording/reading unit to sequentially record corresponding temporary defect information and temporary defect management information as a pair of information, starting from an end of the temporary defect management area.

26. The recording and/or reproducing apparatus of claim 24, wherein the controller controls the recording/reading unit to record information regarding a location of the temporary defect information corresponding to the temporary defect management information and information regarding a location of temporary defect information recorded during another recording operation having the index of at least i−1.

27. The recording and/or reproducing apparatus of claim 22, further comprising a memory unit,
wherein the controller controls the recording/reading unit to record data in predetermined units according to a predetermined recording operation having a common index; verifies the recorded data to detect a defective area of the disc in which a defect exists; creates information regarding the defective area and information regarding a replacement area for the defective area; stores the created information as temporary defect information in the memory unit; and controls the recording/reading unit to record the data recorded in an area following the defective area in predetermined units according to the recording operation, read the temporary defect information from the memory unit, and record the read temporary defect information in the temporary defect management area.

28. The write once disc of claim 1, wherein:
the first temporary defect information includes only the defect in the recorded data detected during the first recording operation without having information on another defect occurring during the prior recording operation,
the write once disc further comprises a temporary finalized defect management area having temporary finalized defect information that includes at least a portion of the first temporary defect information recorded in the temporary defect management area, and temporary finalized defect management information for managing the temporary finalized defect information; and
the at least one defect management area includes of the recorded temporary defect information and temporary defect management information recorded as the defect information and the defect management information, respectively, during disc finalization, and
the temporary defect information and the temporary defect management information are recorded as a pair of information in the temporary defect management area.

29. The write once disc of claim 28, wherein:
the temporary finalized defect management information is recorded whenever the temporary defect management information is recorded k times, and
k is an integer that is more than or equal to 2.

30. The write once disc of claim 29, wherein the temporary finalized defect management information is obtained based on all temporary management information recorded when the temporary finalized defect management information is to be recorded.

31. The write once disc of claim 30, wherein the temporary finalized defect management information comprises all of the temporary defect information included in the temporary management information recorded when the temporary finalized defect management information is desired to be recorded.

32. The write once disc of claim 29, wherein the at least one defect management area comprises at least two defect management areas.

33. The write once disc of claim 28, wherein the temporary defect information and the temporary defect management information are recorded adjacent to each other in the temporary defect management area.

34. The write once disc of claim 28, wherein the temporary defect information and the temporary defect management information are recorded as a pair of information in the temporary defect management area in units of a predetermined number of blocks.

35. The write once disc of claim 33, wherein the temporary defect information and the temporary defect management information are recorded several times, and the temporary defect management information further includes information regarding a recording location of corresponding temporary defect information.

36. The write once disc of claim 33, wherein the temporary defect information includes a pointer pointing to the location of a defect and a pointer pointing to a location of a replacement area for the defect.

37. The write once disc of claim 35, wherein the temporary defect management area is divided into a plurality of parts, and a copy of the temporary defect information and the temporary defect management information are recorded in each of the plurality of parts.

38. The method of claim 10, wherein:
the recording the temporary defect information comprises recording the temporary defect information regarding the data, which is recorded in the data area of the disc according to the recording operation having the index of i, as the ith temporary management information in the temporary defect management area in units of a predetermined number of blocks,
the method further comprising recording temporary finalized defect management information, which is obtained based on all of the recorded temporary management information, in a temporary finalized defect management area whenever the temporary management information is recorded k times, wherein k is an integer more than or equal to 2;
repeating the recording of the recording the temporary finalized defect management information at least once; and
the reading and writing further comprises reading all of the recorded temporary defect management information including temporary management information recorded in the temporary finalized defect management information and temporary defect information and recording the temporary defect management information and temporary defect information in the defect management area.

39. The method of claim 38, wherein the reading and recording the temporary defect management information are performed after recording of data in the data area according to a last recording operation.

40. The method of claim 38, wherein: the recording the temporary defect management information comprises sequentially recording the temporary defect information and the temporary defect management information as a pair of information adjacent to each other, starting from a start of the temporary defect management area.

41. The method of claim 40, wherein:
the recording the temporary defect management information comprises recording the temporary defect information and the temporary defect management information repeatedly, and
each temporary defect management information specifies a location of a corresponding temporary defect information and a location of a temporary defect information that is recorded during another recording operation having the index of at least i−1.

42. The method of claim 41, wherein:

the disc includes a plurality of temporary defect management areas, and the recording the temporary defect management information comprises recording a copy of the temporary defect information and the temporary defect management information in each of the plurality of temporary defect management areas.

43. The method of claim 38, wherein the recording the temporary defect management information comprises recording the temporary defect information and the temporary defect management information sequentially as a pair of information adjacent to each other, starting from an end of the temporary defect management area.

44. The method of claim 43, wherein the recording the temporary defect management information comprises recording the temporary defect information and the temporary defect management information repeatedly.

45. The method of claim 44, wherein:

the disc includes a plurality of temporary defect management areas, and the recording the temporary defect management information comprises recording a copy of the temporary defect information and the temporary defect management information in each of the plurality of temporary defect management areas.

46. The method of claim 44, wherein:

the recording the temporary defect management information comprises recording the temporary defect information and the temporary defect management information repeatedly, and each of the temporary defect management information specifies a location of corresponding temporary defect information and a location of temporary defect information that is recorded during another recording operation having the index of at least i−1.

47. The method of claim 38, wherein the recording the temporary defect management information comprises:

recording data in predetermined units during a corresponding recording operation having a common index:

verifying the recorded data to detect a defective area of the disc in which a defect exists;

storing information regarding the defective area and information regarding a replacement area for the defective area as temporary defect information in a memory of a recording apparatus;

repeating the recording the data, the verifying the recorded data, and the storing the information at least once; and reading temporary defect information from the memory, and recording the temporary defect information and temporary defect management information for managing the temporary defect information in the temporary defect management area in units of a predetermined number of blocks, when the recording operation ends.

48. The recording and/or reproducing apparatus of claim 19 wherein the controller controls the recording/reading unit to:

further record the temporary management information in the temporary defect management area in units of a predetermined number of blocks, and record temporary finalized defect management information obtained based on all of the recorded temporary defect management information in a temporary finalized defect management area whenever the temporary management information is recorded k times after k recording operations.

49. The recording and/or reproducing apparatus of claim 48, wherein the controller controls the recording/reading unit to record the temporary defect information and the temporary defect management information, which constitute the temporary defect information, as a pair of information to be adjacent to each other.

50. The recording and/or reproducing apparatus of claim 48, wherein the controller controls the recording/reading unit to record information regarding the location of temporary defect information corresponding to the temporary defect management information, and information regarding the location of temporary defect information recorded in a prior recording operation right before the recording operation of the corresponding temporary defect information.

51. The recording and/or reproducing apparatus of claim 48, wherein the controller controls the recording/reading unit to record defect information and defect management information, which is obtained based on all recorded temporary management information and temporary finalized defect management information, in a defect management area during disc finalization.

52. The recording and/or reproducing apparatus of claim 48, wherein:

the disc includes a plurality of temporary defect management areas, and the controller controls the recording/reading unit to record a copy of the temporary management information in each of the plurality of temporary defect management areas.

* * * * *

UNITED STATES PATENT AND TRADEMARK OFFICE
CERTIFICATE OF CORRECTION

PATENT NO. : 7,330,409 B2  
APPLICATION NO. : 10/751729  
DATED : February 12, 2008  
INVENTOR(S) : Sung-hee Hwang et al.

It is certified that error appears in the above-identified patent and that said Letters Patent is hereby corrected as shown below:

Column 24, line 41, change "index:" to --index i--.

Signed and Sealed this

Third Day of June, 2008

JON W. DUDAS  
*Director of the United States Patent and Trademark Office*